US012609806B2

(12) United States Patent (10) Patent No.: US 12,609,806 B2
Khoshnevisan et al. (45) Date of Patent: Apr. 21, 2026

(54) DISALLOWED COMMUNICATION DIRECTION FOR FULL-DUPLEX TIME INTERVALS

(71) Applicant: QUALCOMM Incorporated, San Diego, CA (US)

(72) Inventors: Mostafa Khoshnevisan, San Diego, CA (US); Muhammad Sayed Khairy Abdelghaffar, San Jose, CA (US); Jing Sun, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 18/191,696

(22) Filed: Mar. 28, 2023

(65) Prior Publication Data

US 2024/0333467 A1 Oct. 3, 2024

(51) Int. Cl.
*H04L 5/14* (2006.01)
*H04L 5/00* (2006.01)

(52) U.S. Cl.
CPC .............. *H04L 5/14* (2013.01); *H04L 5/0096* (2013.01)

(58) Field of Classification Search
CPC ................................ H04L 5/0096; H04L 5/14
See application file for complete search history.

(56) References Cited

U.S. PATENT DOCUMENTS

| | | | |
|---|---|---|---|
| 9,456,454 B2 | 9/2016 | Gao et al. | |
| 11,705,993 B2 * | 7/2023 | Khoshnevisan | ...... H04L 1/1854 |
| | | | 370/329 |
| 2018/0048432 A1 * | 2/2018 | Sun | ...................... H04L 1/1819 |
| 2021/0111835 A1 * | 4/2021 | Khoshnevisan | ...... H04W 72/02 |

(Continued)

FOREIGN PATENT DOCUMENTS

| WO | 2020146512 A1 | 7/2020 |
|---|---|---|
| WO | 2022185281 A1 | 9/2022 |

OTHER PUBLICATIONS

International Search Report and Written Opinion—PCT/US2024/018526—ISA/EPO—Jul. 12, 2024.

(Continued)

*Primary Examiner* — Bailor C Hsu
(74) *Attorney, Agent, or Firm* — Harrity & Harrity LLP

(57) ABSTRACT
Various aspects of the present disclosure generally relate to wireless communication. Some aspects relate to a disallowed communication direction for full-duplex time intervals. Some aspects more specifically relate to defining, for a user equipment (UE), an allowable communication direction and/or a disallowed communication direction for full-duplex time intervals (for example, for slots and/or symbols associated with full-duplex operations). In some aspects, a network node transmitting, to a UE, an indication of a communication direction that is disabled or is to be dropped (for example, not received or transmitted) during slots or symbols that are associated with full-duplex operations at the network node. The UE may transmit or receive communications, during a full-duplex time interval, that are in an allowed communication direction (for example, that are not in the disallowed communication direction).

30 Claims, 14 Drawing Sheets

1100 ⟶

(56) References Cited

U.S. PATENT DOCUMENTS

| | | | | |
|---|---|---|---|---|
| 2021/0184800 | A1* | 6/2021 | Zhou ..................... | H04B 7/063 |
| 2021/0203469 | A1* | 7/2021 | Abedini ............... | H04W 72/56 |
| 2021/0337489 | A1 | 10/2021 | Abotabl et al. | |
| 2022/0159698 | A1 | 5/2022 | Hosseini et al. | |
| 2023/0199816 | A1 | 6/2023 | Zhang et al. | |
| 2023/0292294 | A1* | 9/2023 | Rudolf ................. | H04L 5/0053 |
| 2023/0361938 | A1* | 11/2023 | He ...................... | H04W 72/232 |
| 2024/0113846 | A1* | 4/2024 | Abdelghaffar ........... | H04L 5/14 |
| 2024/0284510 | A1* | 8/2024 | Mahama .............. | H04L 5/0012 |

OTHER PUBLICATIONS

Wang F (CMCC)., et al., "Discussion on Subband Non-overlapping Full Duplex", 3GPP TSG RAN WG1 #112, R1-2301000, Type Discussion, FS_NR_DUPLEX_EVO, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 18 Pages, XP052248143, the whole document.

Moderator (CATT): "Summary #2 of Subband Non-Overlapping Full Duplex", R1-220xxxx, 3GPP TSG RAN WG1 #110, Toulouse, France, Aug. 22-26, 2022, 85 Pages.

Samsung: "SBFD Feasibility and Design Considerations for NR Duplex Evolution", R1-2209729, 3GPP TSG-RAN WG1 Meeting #110bis-e, e-Meeting, Oct. 10-19, 2022, pp. 1-27.

Samsung: "SBFD Feasibility and Design Considerations for NR Duplex Evolution", R1-2212043, 3GPP TSG-RAN WG1 Meeting #111, Toulouse, France, Nov. 14-18, 2022, pp. 1-27.

* cited by examiner

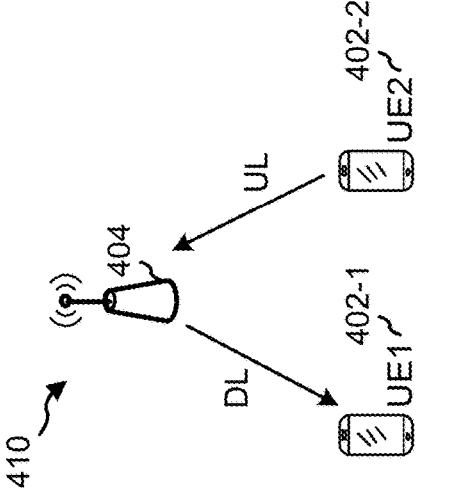
FIGURE 4B
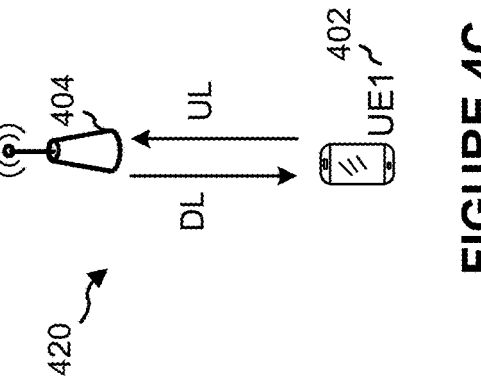
FIGURE 4C
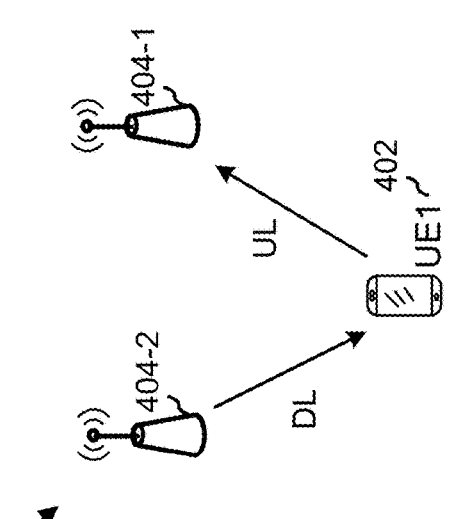
FIGURE 4A

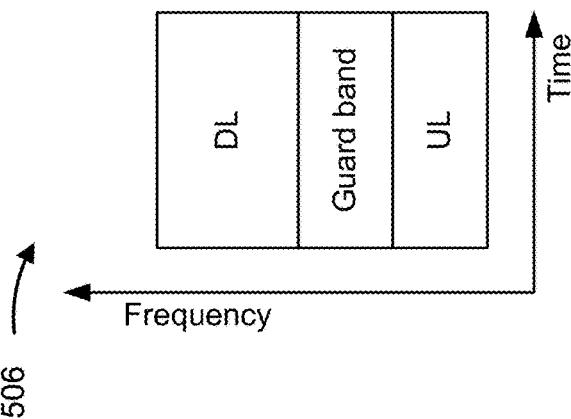
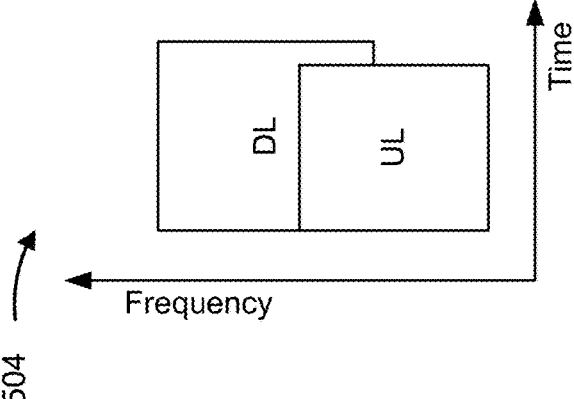
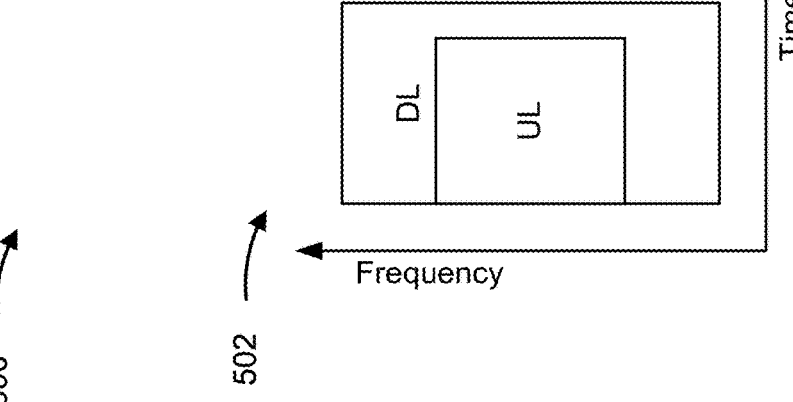
FIGURE 5

600

602

DL Slot
604a

DL Slot
604b

DL Slot
604c

UL Slot
606

Time

Frequency

608

DL Slot
610

DL
612a

UL 614a

DL
612b

UL 614b

DL
612c

DL
612d

UL Slot
618

Time

Frequency

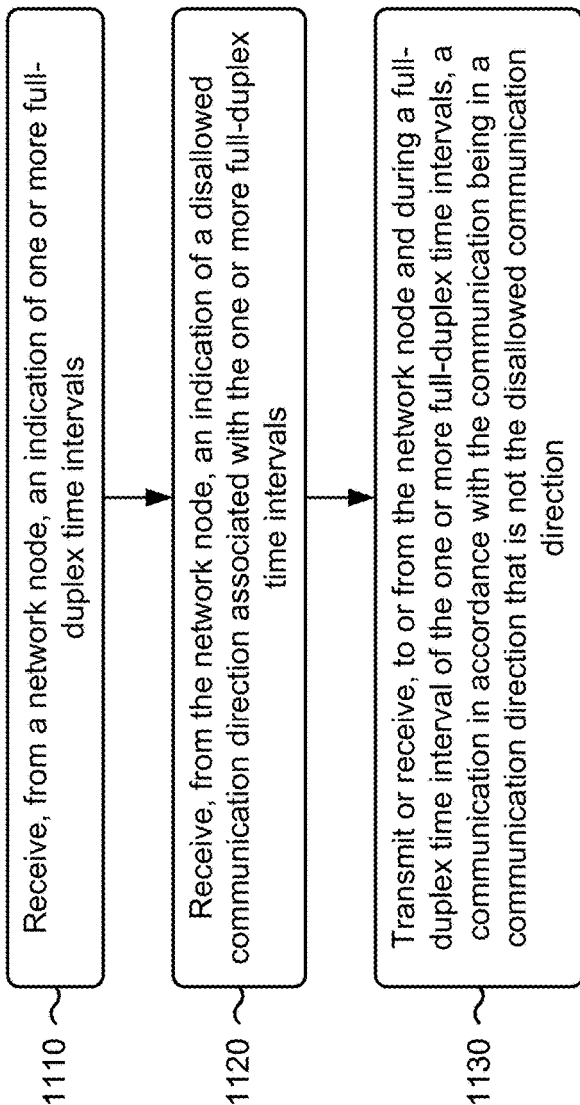

1110 — Receive, from a network node, an indication of one or more full-duplex time intervals 1120 — Receive, from the network node, an indication of a disallowed communication direction associated with the one or more full-duplex time intervals 1130 — Transmit or receive, to or from the network node and during a full-duplex time interval of the one or more full-duplex time intervals, a communication in accordance with the communication being in a communication direction that is not the disallowed communication direction

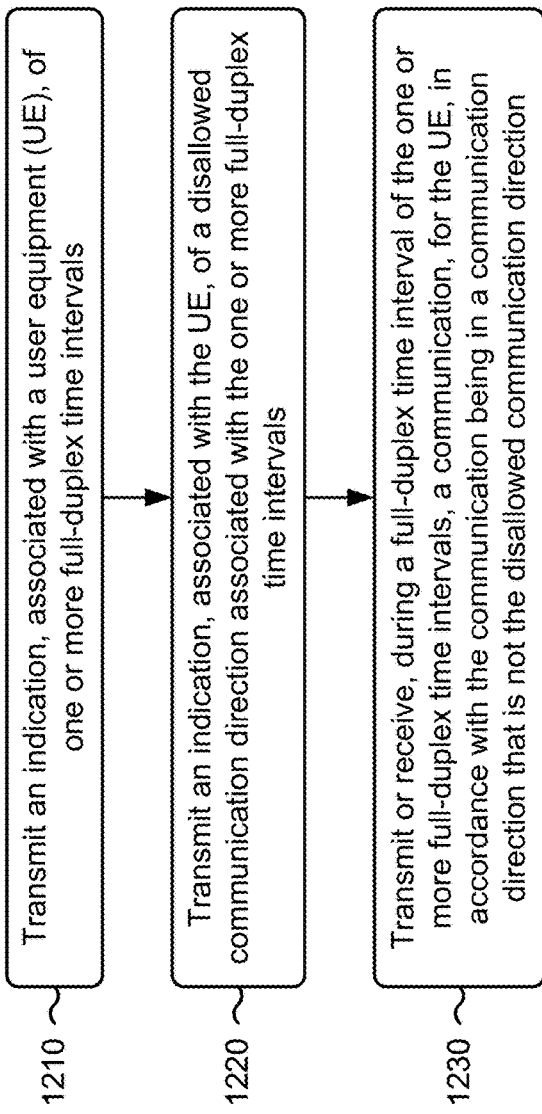

1210 — Transmit an indication, associated with a user equipment (UE), of one or more full-duplex time intervals 1220 — Transmit an indication, associated with the UE, of a disallowed communication direction associated with the one or more full-duplex time intervals 1230 — Transmit or receive, during a full-duplex time interval of the one or more full-duplex time intervals, a communication, for the UE, in accordance with the communication being in a communication direction that is not the disallowed communication direction

DISALLOWED COMMUNICATION DIRECTION FOR FULL-DUPLEX TIME INTERVALS

FIELD OF THE DISCLOSURE

Aspects of the present disclosure generally relate to wireless communication and specifically, to techniques and apparatuses associated with disallowed communication direction for full-duplex time intervals.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, a network node may operate using different operating states. In the different operating states, the network node may use different antennas, different antenna panels, different antenna configurations, and/or different transmission reception points (TRPs) to communicate with one or more user equipments (UEs). For example, the network node may operate in a full-duplex mode (for example, may transmit and receive communications at the same time). To improve spatial isolation of antennas and/or TRPs used for respective communication directions, the network node may use a first antenna and/or a first TRP for downlink signals and a second antenna and/or a second TRP for uplink signals when operating in the full-duplex mode. For example, improving a spatial isolation of the first antenna and/or the first TRP from the second antenna and/or the second TRP may reduce self-interference associated with full-duplex operations. Therefore, the first antenna and/or the first TRP of the network node may be unavailable for uplink signals and the second antenna and/or the second TRP of the network node may be unavailable for downlink signals when the network node is operating in the full-duplex mode.

In some cases, a UE may experience poor performance for a given communication direction when the network node is operating in the full-duplex mode because of the unavailability of a given TRP for uplink or downlink communications. For example, a serving TRP (for example, for downlink and uplink) for the UE may be used by the network node for a given communication direction when the network node is operating in the full-duplex mode. The UE may not support multiple active transmission configuration indicator (TCI) states or beams. If the active TCI state or beam (for example, for uplink communications) associated with the UE is associated with a spatial direction toward the TRP, then the UE may be unable to transmit or receive communications in the given communication direction during a full-duplex time interval (for example, because the TRP is unavailable for the given communication direction and the UE is unable to support an additional active beam or TCI state associated with another TRP). Additionally or alternatively, a link between the UE and another TRP (for example, that is used by the network node for the given communication direction) may be associated with poor radio conditions (for example, a large pathloss), resulting in poor performance of communications, in the given communication direction, between the UE and the other TRP.

In some examples, the UE may rely on the network node to refrain from scheduling communications in the given communication direction during the full-duplex time intervals. However, relying on the network node to perform scheduling determinations may not be feasible or reliable in some situations. For example, some communications may be periodic and/or semi-persistent (for example, occurring every X slots, symbols, or milliseconds). The periodicity of these communications may not align with the slot format periodicity, resulting in some of the periodic and/or semi-persistent communications being scheduled to occur during a full-duplex time interval. As another example, a communication may be associated with one or more repetitions. Although the communication may be scheduled during a non-full-duplex time interval, a repetition of the communication may occur during a full-duplex time interval. As another example, a single downlink control information (DCI) communication may schedule multiple communications (for example, may schedule different transport blocks). Although one or more of the multiple communications may be scheduled during a non-full-duplex time interval, one or more other communications may occur during a full-duplex time interval.

The UE may be unaware of the given communication direction (for example, that may be associated with poor performance for the UE during full-duplex time intervals). Therefore, the UE may consume resources (for example, power resources, processing resources, and/or network resources) attempting to transmit or receive a communication (for example, associated with the given communication direction) to, or from, an antenna and/or TRP of the network node that is unavailable for the given communication direction during full-duplex time intervals.

SUMMARY

Some aspects described herein relate to a user equipment (UE) for wireless communication. The UE may include at least one memory and at least one processor communicatively coupled with the at least one memory. The at least one processor may be operable to cause the UE to receive, from a network node, an indication of one or more full-duplex time intervals. The at least one processor may be operable to cause the UE to receive, from the network node, an indication of a disallowed communication direction associated with the one or more full-duplex time intervals. The at least one processor may be operable to cause the UE to transmit or receive, to or from the network node and during a full-duplex time interval of the one or more full-duplex time intervals, a communication in accordance with the communication being in a communication direction that is not the disallowed communication direction. As a result, how full-duplex time intervals are to be utilized by the UE when the network node is operating in a full-duplex mode is clarified. For example, the UE, during full-duplex time intervals, may transmit or receive communications in an allowed communication direction and/or may drop communications in a disallowed communication direction. This may conserve resources (for example, power resources, processing resources, and/or network resources) of the UE that would have otherwise been used attempting to transmit or receive a communication in the disallowed communication direction (for example to, or from, an antenna and/or TRP of the network node that is unavailable for the disallowed communication direction during full-duplex time intervals). The efficiency of the UE and of the wireless communication system may therefore be improved.

Some aspects described herein relate to a network node for wireless communication. The network node may include at least one memory and at least one processor communicatively coupled with the at least one memory. The at least one processor may be operable to cause the network node to transmit an indication, associated with a UE, of one or more full-duplex time intervals. The at least one processor may be operable to cause the network node to transmit an indication, associated with the UE, of a disallowed communication direction associated with the one or more full-duplex time intervals. The at least one processor may be operable to cause the network node to transmit or receive, during a full-duplex time interval of the one or more full-duplex time intervals, a communication, for the UE, in accordance with the communication being in a communication direction that is not the disallowed communication direction.

Some aspects described herein relate to a method of wireless communication performed by a UE. The method may include receiving, from a network node, an indication of one or more full-duplex time intervals. The method may include receiving, from the network node, an indication of a disallowed communication direction associated with the one or more full-duplex time intervals. The method may include transmitting or receiving, to or from the network node and during a full-duplex time interval of the one or more full-duplex time intervals, a communication in accordance with the communication being in a communication direction that is not the disallowed communication direction.

Some aspects described herein relate to a method of wireless communication performed by a network node. The method may include transmitting an indication, associated with a UE, of one or more full-duplex time intervals. The method may include transmitting an indication, associated with the UE, of a disallowed communication direction associated with the one or more full-duplex time intervals. The method may include transmitting or receiving, during a full-duplex time interval of the one or more full-duplex time intervals, a communication, for the UE, in accordance with the communication being in a communication direction that is not the disallowed communication direction.

Some aspects described herein relate to a non-transitory computer-readable medium that stores a set of instructions for wireless communication by a UE. The set of instructions, when executed by one or more processors of the UE, may cause the UE to receive, from a network node, an indication of one or more full-duplex time intervals. The set of instructions, when executed by one or more processors of the UE, may cause the UE to receive, from the network node, an indication of a disallowed communication direction associated with the one or more full-duplex time intervals. The set of instructions, when executed by one or more processors of the UE, may cause the UE to transmit or receive, to or from the network node and during a full-duplex time interval of the one or more full-duplex time intervals, a communication in accordance with the communication being in a communication direction that is not the disallowed communication direction.

Some aspects described herein relate to a non-transitory computer-readable medium that stores a set of instructions for wireless communication by a network node. The set of instructions, when executed by one or more processors of the network node, may cause the network node to transmit an indication, associated with a UE, of one or more full-duplex time intervals. The set of instructions, when executed by one or more processors of the network node, may cause the network node to transmit an indication, associated with the UE, of a disallowed communication direction associated with the one or more full-duplex time intervals. The set of instructions, when executed by one or more processors of the network node, may cause the network node to transmit or receive, during a full-duplex time interval of the one or more full-duplex time intervals, a communication, for the UE, in accordance with the communication being in a communication direction that is not the disallowed communication direction.

Some aspects described herein relate to an apparatus for wireless communication. The apparatus may include means for receiving, from a network node, an indication of one or more full-duplex time intervals. The apparatus may include means for receiving, from the network node, an indication of a disallowed communication direction associated with the one or more full-duplex time intervals. The apparatus may include means for transmitting or means for receiving, to or from the network node and during a full-duplex time interval of the one or more full-duplex time intervals, a communication in accordance with the communication being in a communication direction that is not the disallowed communication direction.

Some aspects described herein relate to an apparatus for wireless communication. The apparatus may include means for transmitting an indication, associated with a UE, of one or more full-duplex time intervals. The apparatus may include means for transmitting an indication, associated with the UE, of a disallowed communication direction associated with the one or more full-duplex time intervals. The apparatus may include means for transmitting or means for receiving, during a full-duplex time interval of the one or more full-duplex time intervals, a communication, for the UE, in accordance with the communication being in a communication direction that is not the disallowed communication direction.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 4A-4C are diagrams illustrating examples of full-duplex communication in accordance with the present disclosure.

FIG. 5 is a diagram illustrating examples of full-duplex communication, in accordance with the present disclosure.

FIG. 11 is a flowchart illustrating an example process performed, for example, by a UE that supports a disallowed communication direction for full-duplex time intervals in accordance with the present disclosure.

FIG. 12 is a flowchart illustrating an example process performed, for example, by a network node that supports a disallowed communication direction for full-duplex time intervals in accordance with the present disclosure.

Figure 13:
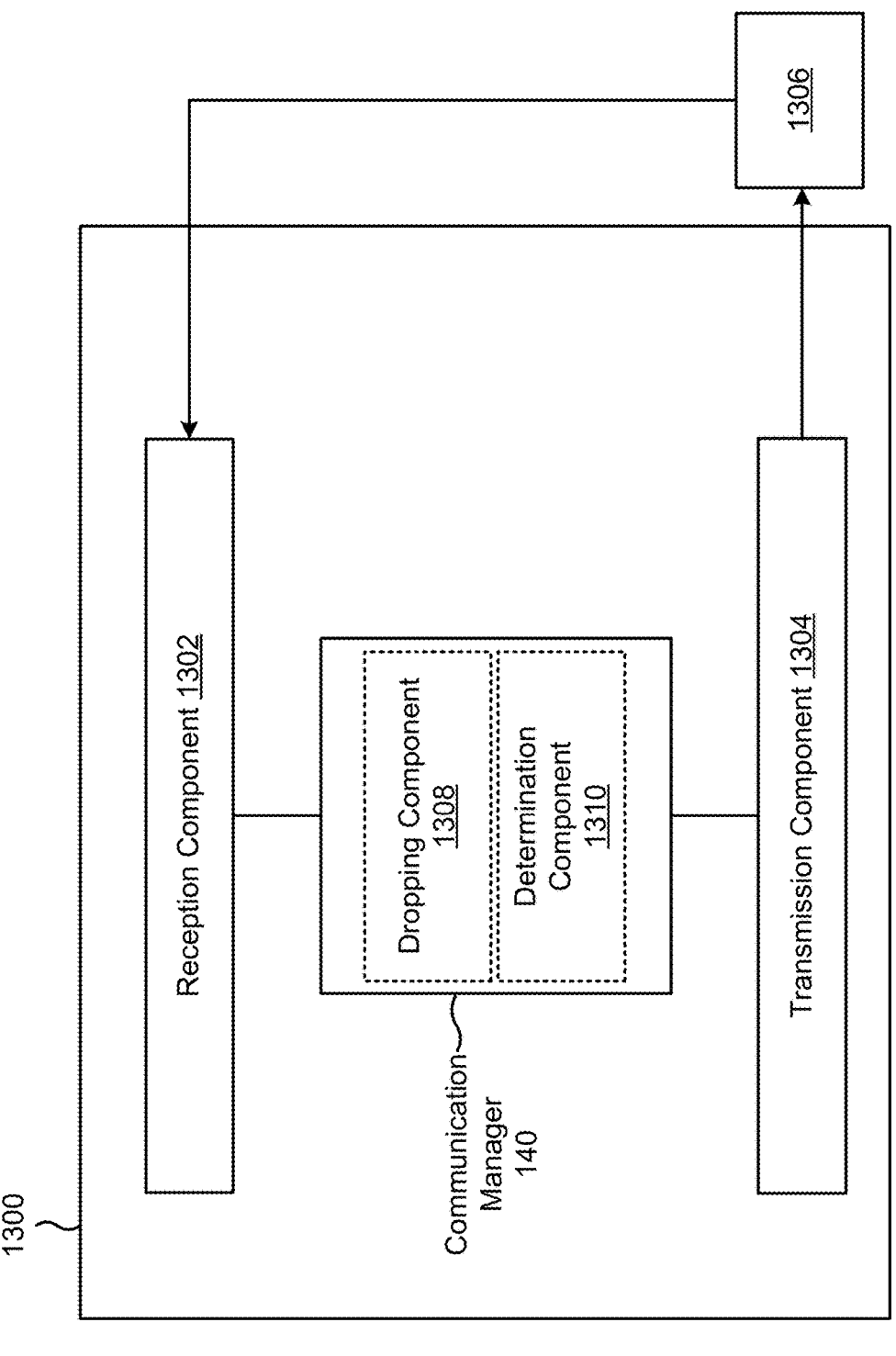

FIG. 13 is a diagram of an example apparatus for wireless communication that supports a disallowed communication direction for full-duplex time intervals in accordance with the present disclosure.

Figure 14:
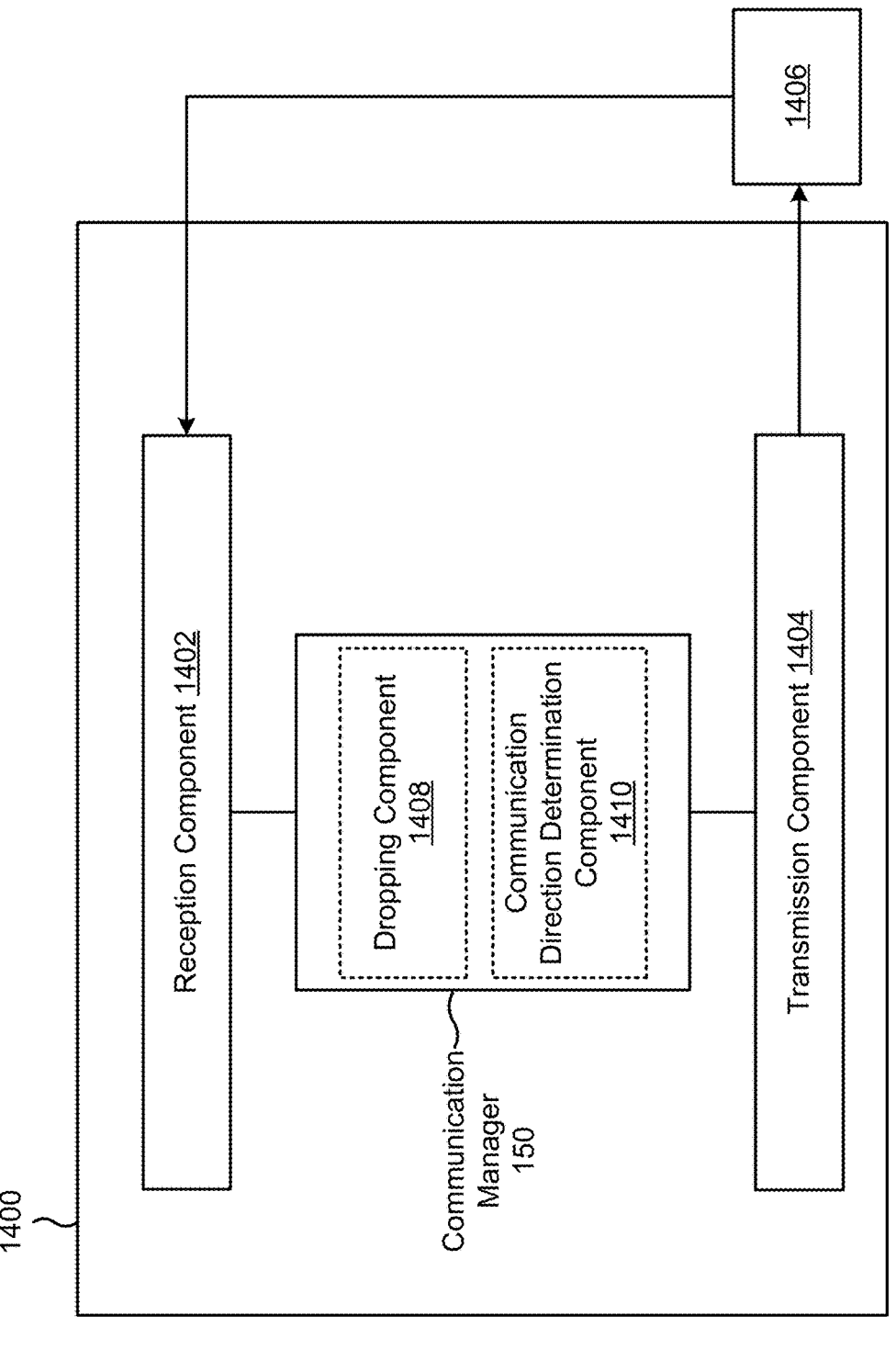

FIG. 14 is a diagram of an example apparatus for wireless communication that supports a disallowed communication direction for full-duplex time intervals in accordance with the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to a disallowed communication direction for full-duplex time intervals. Some aspects more specifically relate to defining, for a user equipment (UE), an allowable communication direction and/or a disallowed communication direction for full-duplex time intervals (for example, for slots and/or symbols associated with full-duplex operations). In some aspects, a network node may transmit an indication of a communication direction (and/or a channel and/or a reference signal) that is disabled or is to be dropped (for example, not received or transmitted) during slots or symbols that are associated with full-duplex operations at the network node. The UE may transmit or receive communications, during a full-duplex time interval, that are in an allowed communication direction (for example, that are not in the disallowed communication direction). In some aspects, the UE may refrain from transmitting or receiving (for example, may drop) a communication, during a full-duplex time interval, that is in the disallowed communication direction.

Particular aspects of the subject matter described in this disclosure can be implemented to realize one or more of the following potential advantages. In some examples, the described techniques can be used to clarify how full-duplex time intervals are to be utilized by the UE when the network node is operating in a full-duplex mode (for example, using non-co-located antennas and/or transmission reception points (TRPs)). For example, the UE, during full-duplex time intervals, may transmit or receive communications in an allowed communication direction and/or may drop communications in a disallowed communication direction. This may conserve resources (for example, power resources, processing resources, and/or network resources) of the UE that would have otherwise been used attempting to transmit or receive a communication in the disallowed communication direction (for example to, or from, an antenna and/or TRP of the network node that is unavailable for the disallowed communication direction during full-duplex time intervals). The efficiency of the UE and of the wireless communication system may therefore be improved.

In some aspects, a feedback operation for dropped communications associated with the disallowed communication direction may be defined. For example, when the UE does not receive a downlink communication (for example, because of the downlink being the disallowed communication direction), the UE may refrain from transmitting hybrid automatic repeat request (HARQ) feedback for the downlink communication (for example, thereby conserving power resources, processing resources, and/or network resources that would have otherwise been used by the UE transmitting the HARQ feedback for the downlink communication that the network node already knows was not transmitted to the UE).

In some aspects, the indication of the disallowed communication direction may be associated with a given control resource set (CORESET) pool index value. For example, the network node may transmit, and the UE may receive, an indication that communications associated with a given communication direction and with a given CORESET pool index value are disallowed, disabled, and/or to be dropped during full-duplex time intervals. This enables improved control and/or flexibility for indicating disallowed communication directions (and/or allowed communication directions) in multi-TRP and/or multi-downlink control information (multi-DCI) scenarios.

Figure 1:
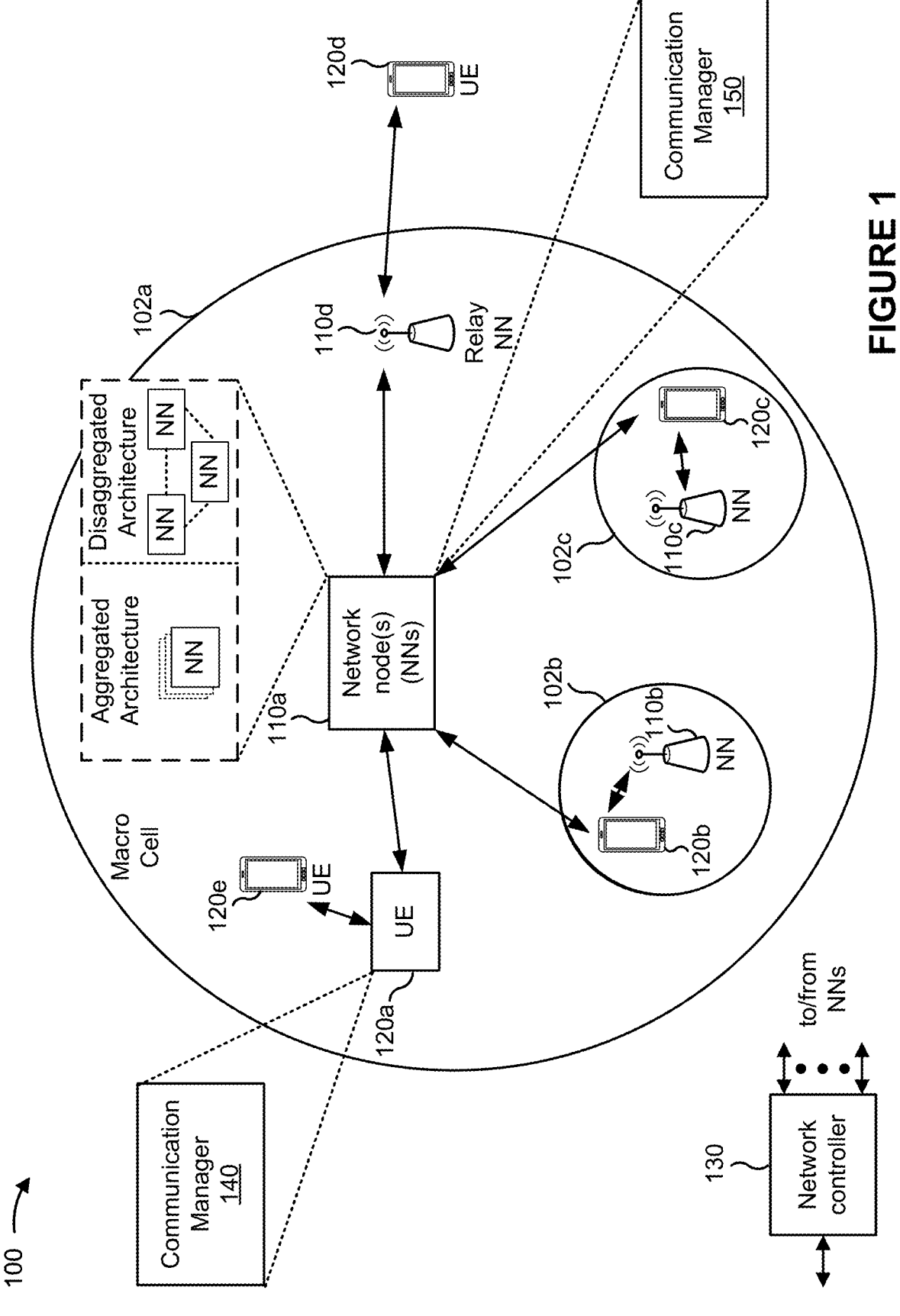
FIG. 1 is a diagram illustrating an example of a wireless network in accordance with the present disclosure.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a TRP, a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, a relay network node, or a relay.

The UEs 120 may be dispersed throughout the wireless network 100, and each UE 120 may be stationary or mobile.

A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120c) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ- 7.125 GHZ) and FR2 (24.25 GHz-52.6 GHz). Although a portion of FRI is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FRI or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, the term "sub-6 GHz." if used herein, may broadly represent frequencies that may be less than 6 GHz, may be within FR1, or may include mid-band frequencies. Further, unless specifically stated otherwise, the term "millimeter wave." if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, an indication of one or more full-duplex time intervals; receive, from the network node, an indication of a disallowed communication direction associated with the one or more full-duplex time intervals; and transmit or receive, to or from the network node and during a full-duplex time interval of the one or more full-duplex time intervals, a communication, in accordance with the communication being in a communication direction that is not the disallowed communication direction. That is, the communication manager 140 of the UE 120 may transmit to the network node or receive from the network node, during a full-duplex time interval of the one or more full-duplex time intervals, a communication, in accordance with the communication being in a communication direction that is not the disallowed communication direction. Additionally or alternatively, the communication manager 140 may perform one or more other operations described herein. The UE 120 may transmit or receive communications, during a full-duplex time interval, in response to the communication being in an allowed communication direction (for example, the communication is not in the disallowed communication direction). Additionally or alternatively, the UE 120 may refrain from transmitting or receiving (for example, may drop) a communication, during a full-duplex time interval, in response to the communication being in the disallowed communication direction (for example, the communication is not in the allowed direction). The allowed communication direction may, for example, be a downlink direction in which communications are transmitted from a network node 110 to the UE 120. In such examples, the disallowed communication direction may be an uplink direction. Alternatively, the allowed direction may, for example, be an uplink direction in which communications are transmitted from the UE 120 to a network node 110. In such examples, the disallowed communication direction may be a downlink direction. The UE 120 may therefore determine, based on, in response to, or otherwise associated with, an indication of a disallowed communication direction received from a network node 110, whether a communication during a full-duplex time interval of one or more full-duplex time intervals is a communication in the disallowed communication direction. The UE 120 may transmit or receive the communication, or refrain from transmitting or receiving the communication, in accordance with the determination.

In some aspects, the network node 110 may include a communication manager 150. As described in more detail elsewhere herein, the communication manager 150 may transmit an indication, associated with a UE, of one or more full-duplex time intervals; transmit an indication, associated with the UE, of a disallowed communication direction associated with the one or more full-duplex time intervals; and transmit or receive, during a full-duplex time interval of the one or more full-duplex time intervals, a communication, for the UE, in accordance with the communication being in a communication direction that is not the disallowed communication direction. That is, the communication manager 150 of the network node 110 may transmit a communication for a UE 120 or receive a communication for/from a UE 120, during a full-duplex time interval of the one or more full-duplex time intervals, in accordance with the communication being in a communication direction that is not the disallowed communication direction. Additionally or alternatively, the communication manager 150 may perform one or more other operations described herein. The network node 110 may transmit or receive communications, during a full-duplex time interval, in response to the communication being in an allowed communication direction (for example, the communication is not in the disallowed communication direction). Additionally or alternatively, the network node 110 may refrain from transmitting or receiving (for example, may drop) a communication, during a full-duplex time interval, in response to the communication being in the disallowed communication direction (for example, the communication is not in the allowed direction). The allowed communication direction may, for example, be a downlink direction in which communications are transmitted from the network node 110 to a UE 120. In such examples, the disallowed communication direction may be an uplink direction. Alternatively, the allowed direction may, for example, be an uplink direction in which communications are transmitted from a UE 120 to the network node 110. In such examples, the disallowed communication direction may be a downlink direction. The network node 110 may therefore determine, based on, in response to, or otherwise associated with, an indication of a disallowed communication direction associated with a UE 120, whether a communication during a full-duplex time interval of one or more full-duplex time intervals is a communication in the disallowed communication direction. The network node 110 may transmit or receive the communication, or refrain from transmitting or receiving the communication, in accordance with the determination.

Figure 2:
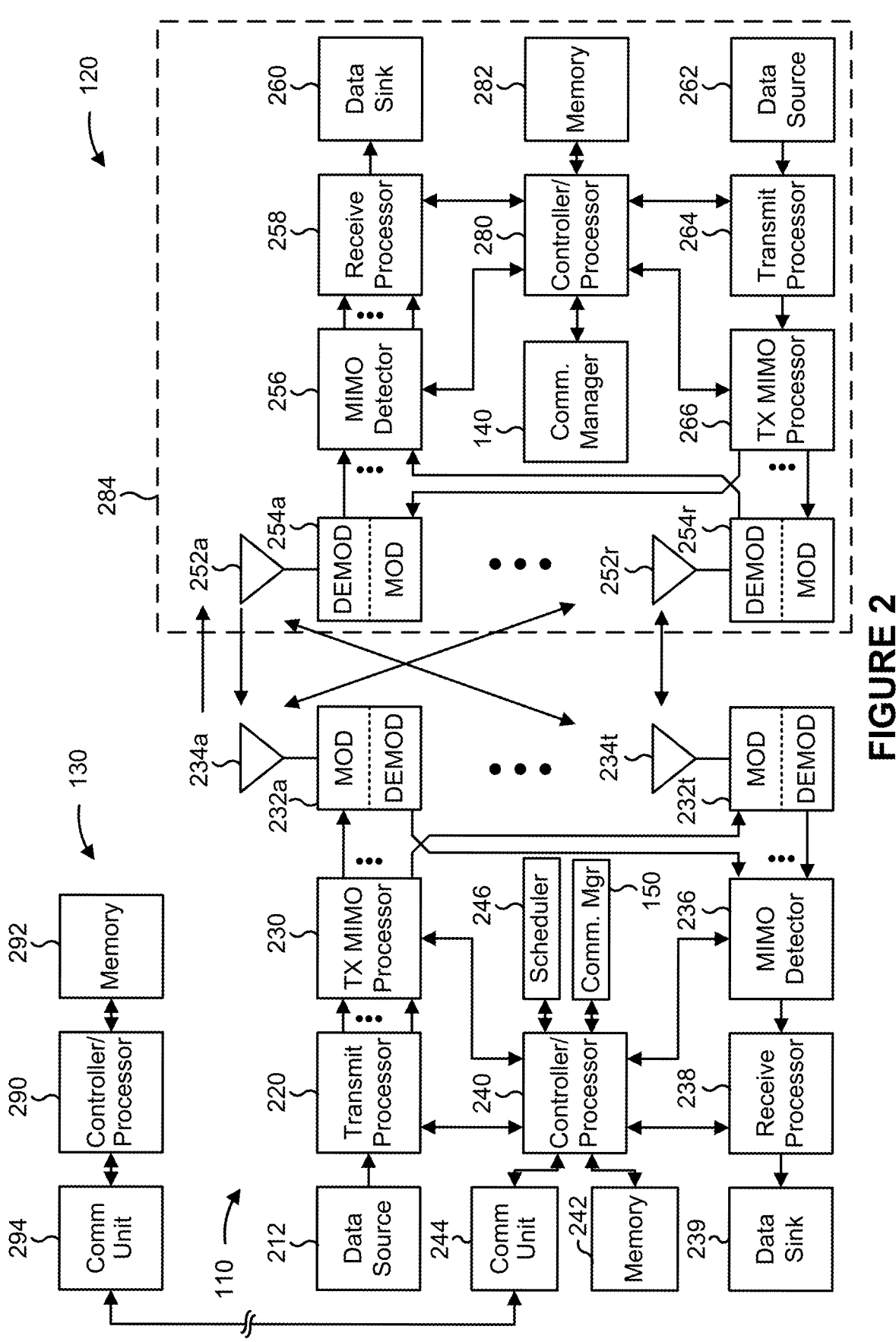
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with disallowed communication direction for full-duplex time intervals, as described in more detail elsewhere herein. For example, the controller/processor 240 of the network node 110, the controller/processor 280 of the UE 120, or any other component(s) of FIG. 2 may perform or direct operations of, for example, process 1100 of FIG. 11, process 1200 of FIG. 12, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1100 of FIG. 11, process 1200 of FIG. 12, or other processes as described herein. In some examples, executing instructions may include running the instructions, converting the instructions, compiling the instructions, or interpreting the instructions, among other examples.

In some aspects, the UE 120 may include means for receiving, from a network node, an indication of one or more full-duplex time intervals; means for receiving, from the network node, an indication of a disallowed communication direction associated with the one or more full-duplex time intervals; and/or means for transmitting or means for receiving, to or from the network node (for example, means for transmitting to the network node, or means for receiving from the network node) and during a full-duplex time interval of the one or more full-duplex time intervals, a communication in accordance with the communication being in a communication direction that is not the disallowed communication direction. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 may include means for transmitting an indication, associated with a UE, of one or more full-duplex time intervals; means for transmitting an indication, associated with the UE, of a disallowed communication direction associated with the one or more full-duplex time intervals; and/or means for transmitting or means for receiving, during a full-duplex time interval of the one or more full-duplex time intervals, a communication, the communication being in a communication direction that is not the disallowed communication direction. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

As used herein, the network node 110 "outputting" or "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (for example, triggering transmission of a physical layer reference signal). Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" a communication may refer to receiving a transmission carrying the communication directly (for example, from the UE 120 to the network node 110) or receiving the communication (or information derived from reception of the communication) via one or more other network nodes or devices.

Figure 3:
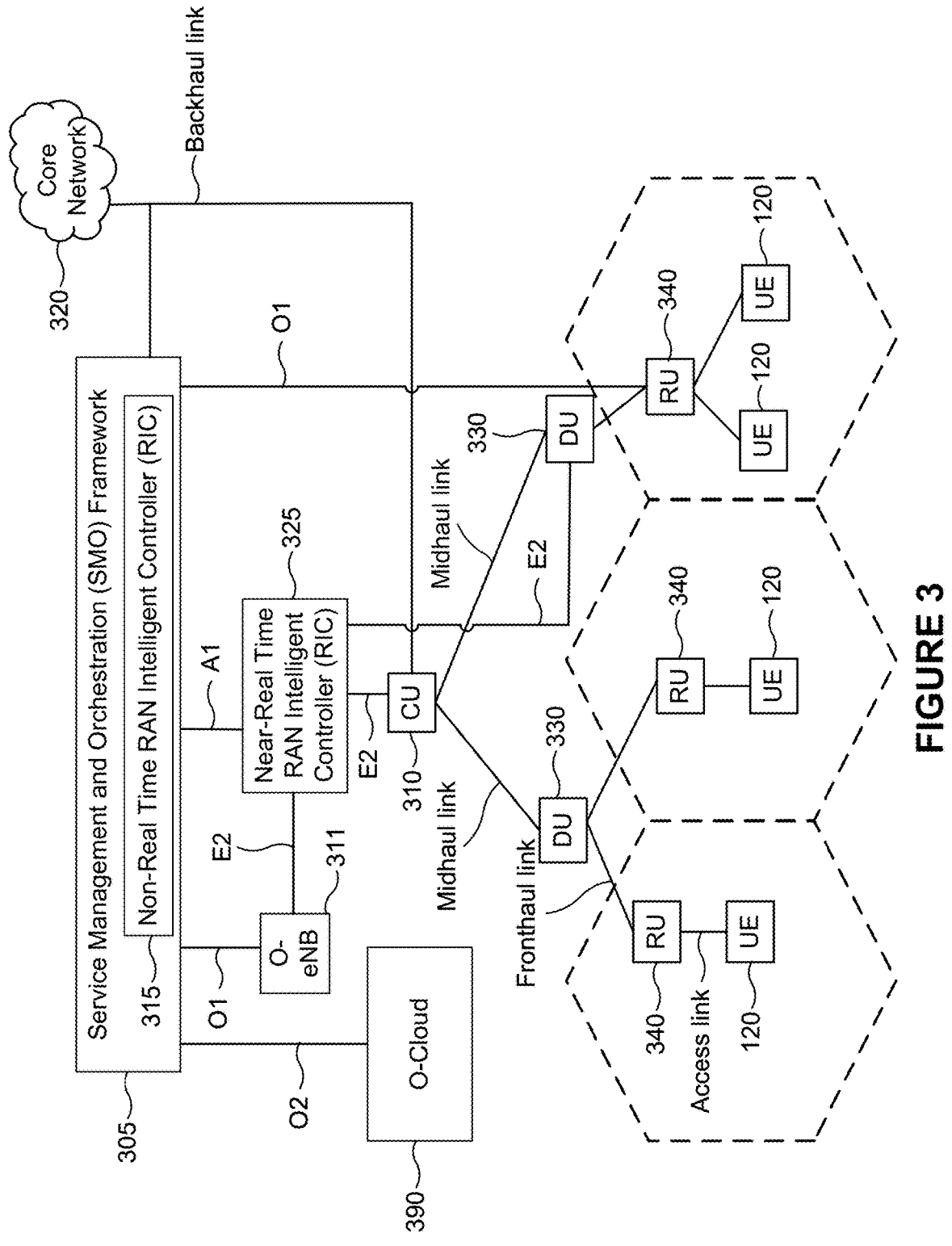
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the El interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open CNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

In some examples, an access node may include an access node controller. The access node controller may be a CU of a distributed RAN. In some examples, a backhaul interface to a core network may terminate at the access node controller. The core network may include a 5G control plane component and a 5G user plane component (for example, a 5G gateway that includes both the 5G control plane component and the 5G user plane component), and a backhaul interface for one or both of the 5G control plane and the 5G user plane may terminate at the access node controller. Additionally or alternatively, a backhaul interface to one or more neighbor access nodes (for example, another access node) may terminate at the access node controller.

The access node controller may be associated with or may communicate with one or more TRPs (for example, via an F1 Control (F1-C) interface or an F1 User (F1-U) interface). In some cases, a TRP may be referred to as a cell, a panel (for example, an antenna panel), an antenna array, or an array, among other examples. Each TRP may be a DU or an RU of the distributed RAN. A TRP may be connected to a single access node controller or to multiple access node controllers. In some examples, a TRP may correspond to a base station described above in connection with FIG. 1, 2, or 3. For example, different TRPs may be included in different respective base stations. Additionally or alternatively, multiple TRPs may be included in a single base station. In some aspects, a disaggregated base station may include a CU (for example, access node controller) or one or more DUs (for example, one or more TRPs). In some examples, a functional split of base station functionality between an access node controller (for example, a CU), and a TRP (for example, a DU or an RU) may be defined, such as by the 3GPP. For example, a PDCP layer, an RLC layer, or a MAC layer may be configured to terminate at the access node controller or at a TRP.

In some examples, multiple TRPs may transmit communications (for example, the same communication or different communications) in a same transmission time interval (TTI) (for example, a slot, a mini-slot, a subframe, or a symbol) or in different TTIs using different quasi co-location (QCL) relationships (for example, different spatial parameters, different TCI states, different precoding parameters, or different beamforming parameters). In some aspects, a TCI state may be used to indicate one or more QCL relationships. Each TRP may be configured to individually (for example, using dynamic selection) or jointly (for example, using joint transmission with one or more other TRPs) serve traffic to a UE 120.

In some examples, a first physical downlink control channel (PDCCH) (PDCCH 1) communication transmitted by a first TRP (TRP A) may schedule a first physical uplink shared channel (PUSCH) communication (PUSCH 1) for transmitting uplink data to the TRP A and a second TRP (TRP B) may schedule a second PUSCH communication (PUSCH 2) for transmitting uplink data to the TRP B. A control resource set (CORESET) pool index (or CORESET-PoolIndex) value may be used by the UE 120 to identify a TRP associated with an uplink grant received on a PDCCH. For example, multiple PDCCHs may be used to schedule downlink or uplink data communications for multiple corresponding physical downlink shared channels (PDSCHs) or multiple corresponding PUSCHs (for example, one PDCCH for each PDSCH or PUSCH). In such examples, DCI (for example, having DCI format 1_0 or DCI format 1_1) may indicate a corresponding transmission configuration indicator (TCI) state for a TRP corresponding to the DCI. The TCI field of a DCI indicates the corresponding TCI state (for example, the TCI field of the first DCI indicates the first TCI state and the TCI field of the second DCI indicates the second TCI state). This may be referred to as a multiple DCI (mDCI) multi-TRP operation.

Multi-DCI based multi-TRP operation configuration allows the UE to concurrently communicate via multiple TRPs. For example, a UE may receive, from a first TRP, first DCI in a first PDCCH, where the first DCI schedules a first PDSCH or PUSCH to be transmitted by the first TRP. Similarly, the UE may receive, from a second TRP, second DCI in a second PDCCH, where the second DCI schedules a second PDSCH or PUSCH to be transmitted by the second TRP. The first and second PDSCHs or PUSCHs can be non-overlapping, partially overlapping, or fully overlapping. In association with monitoring DCIs transmitted from different TRPs, the UE may monitor PDCCH candidates in PDCCH monitoring occasions in different CORESETs.

"CORESET" may refer to a control region that is structured to support an efficient use of resources, such as by flexible configuration or reconfiguration of resources for one or more PDCCHs associated with a UE. In some examples, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using RRC signaling to indicate a frequency domain region (for example, a quantity of resource blocks) or a time domain region (for example, a quantity of symbols) for the CORESET.

A UE 120 may be configured with multiple CORESETs in a given serving cell. Each CORESET configured for the UE 120 may be associated with a CORESET identifier (CORESET ID). In some examples, two or more (for example, up to five) CORESETs may be grouped into a CORESET pool. Each CORESET pool may be associated with a CORESET pool index value. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a given TRP. As an example, the TRP A may be associated with CORESET pool index 0, and the TRP B may be associated with CORESET pool index 1. The UE 120 may be configured by a higher layer parameter, such as PDCCH-Config RRC parameter, with information identifying an association between a TRP and a CORESET pool index value assigned to the TRP. Accordingly, the UE 120 may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP associated with the CORESET pool index value.

FIGS. 4A-4C are diagrams illustrating examples of full-duplex communication in accordance with the present disclosure. A first full-duplex scenario 400 depicted in FIG. 4A includes a UE1 402 and two network nodes (for example, network entities or TRPs) 404-1, 404-2, where the UE1 402 is sending uplink transmissions to network node 404-1 and is receiving downlink transmissions from network node 404-2. In the first full-duplex scenario 400 of FIG. 4A, full-duplex is enabled for the UE1 402, but not for the network nodes 404-1, 404-2. A second full-duplex scenario 410 depicted in FIG. 4B includes two UEs, shown as UE1 402-1 and UE2 402-2, and a network node 404, where the UE1 402-1 is receiving a downlink transmission from the network node 404 and the UE2 402-2 is transmitting an uplink transmission to the network node 404. In the second full-duplex scenario 410, full-duplex is enabled for the network node 404, but not for UE1 402-1 and UE2 402-2. A third full-duplex scenario 420 is depicted in FIG. 4C that includes a UE1 402 and a network node 404, where the UE1 402 is receiving a downlink transmission from the network node 404 and the UE1 402 is transmitting an uplink transmission to the network node 404. In the third full-duplex scenario 420, full-duplex is enabled for both the UE1 402 and the network node 404.

FIG. 5 is a diagram illustrating examples of full-duplex communication 500, in accordance with the present disclosure. A UE may operate in an in-band full-duplex mode. In the in-band full-duplex mode, the UE may transmit and receive on a same time and frequency resource. An uplink and a downlink may share the same time and frequency resource. For example, in a first full-duplex communication 502, a time and frequency resource for the uplink may fully overlap with a time and frequency resource for the downlink. As another example, in a second full-duplex communication 504, a time and frequency resource for the uplink may partially overlap with a time and frequency resource for the downlink.

A UE may operate in a subband full-duplex (SBFD) mode. The SBFD mode may also be referred to as a subband frequency division duplex mode or a flexible duplex mode. In the SBFD mode, the UE may transmit and receive at a same time, but the UE may transmit and receive on different frequency domain resources. For example, in a third full-duplex communication 506, a downlink resource may be separated from an uplink resource by a guard band in a frequency domain. In some examples, SBFD may be associated with a network node that is operating in a full-duplex mode (for example, transmitting and receiving at the same time on different frequency domain resources). In such examples, UEs communicating with the network node may be operating in a half-duplex mode.

In some examples, a slot configuration may include a combination of downlink slots, uplink slots, or full-duplex slots (for example, a SBFD slot or an in-band full-duplex slot). A full-duplex slot may include one or more downlink time/frequency resources and one or more uplink time/frequency resources. A downlink time/frequency resource in the full-duplex slot may be separated (for example, in time or frequency) from an uplink time/frequency resource in the full-duplex slot by a gap, which may function to reduce self-interference and improve latency and uplink coverage. For example, the gap may be a frequency offset or a frequency gap between downlink time/frequency resources and uplink time/frequency resources in the same full-duplex slot. For example, a network node may be operating in a full-duplex mode (for example, transmitting and receiving at the same time on the same or different frequency domain resources). The network node may schedule a first UE to receive a downlink communication in a full-duplex slot. The network node may schedule a second UE to transmit an uplink communication in the same full-duplex slot.

Figure 6:
FIG. 6 is a diagram illustrating an example of a full-duplex slot configuration in accordance with the present disclosure.

FIG. 6 is a diagram illustrating an example of a full-duplex slot configuration 600 in accordance with the present disclosure. In some examples, a UE 120 may be configured with a first configuration 602. In some examples, the first configuration 602 may indicate a first slot format pattern (sometimes called a time division duplex (TDD) pattern) associated with a half-duplex mode or a full-duplex mode. The first slot format pattern may include a quantity of downlink slots (for example, three downlink slots 604*a*, 604*b*, and 604*c*, as shown), a quantity of flexible slots (not shown), and/or a quantity of uplink slots (for example, one uplink slot 606, as shown). The first slot format pattern may repeat over time. In some examples, a network node 110 may indicate the first slot format pattern to a UE 120 using one or more slot format indicators. A slot format indicator, for a slot, may indicate whether that slot is an uplink slot, a downlink slot, or a flexible slot, among other examples.

The network node 110 may transmit an indication (for example, an RRC message, a MAC control element (MAC-CE), or DCI) to the UE 120 to switch from the first configuration 602 to a second configuration 608. As an alternative, the UE 120 may indicate to the network node 110 that the UE 120 is switching from the first configuration 602 to the second configuration 608. The second configuration 608 may indicate a second slot format pattern that repeats over time, similar to the first slot format pattern. In any of the examples described above, the UE 120 may switch from the first configuration 602 to the second configuration 608 during a time period (for example, a quantity of symbols and/or an amount of time) based on, in response to, or otherwise associated with an indication received from the network node 110 (for example, before switching back to the first configuration 602). During that time period, the UE 120 may communicate using the second slot format pattern, and then may revert to using the first slot format pattern after the end of the time period. The time period may be indicated by the network node 110 (for example, in the instruction to switch from the first configuration 602 to the second configuration 608, as described above) and/or based on, in response to, or otherwise associated with a programmed and/or otherwise preconfigured rule. For example, the rule may be based at least in part on a table (for example, defined in 3GPP specifications and/or another wireless communication standard) that associates different sub-carrier spacings (SCSs) and/or numerologies (for example, represented by u and associated with corresponding SCSs) with corresponding time periods for switching configurations.

The second slot format pattern may include two SBFD slots in place of what were downlink slots in the first slot format pattern. In example 600, the second slot format pattern includes a downlink slot 610 and an uplink slot 618. In some examples, each SBFD slot includes a partial slot (for example, a portion or sub-band of a frequency allocated for use by the network node 110 and the UE 120) for downlink (for example, partial slots 612a, 612b, 612c, and 612d, as shown) and a partial slot for uplink (for example, partial slots 614a and 614b, as shown). Accordingly, the UE 120 may operate using the second slot format pattern to transmit an uplink communication in an earlier slot (for example, the second slot in sequence, shown as partial uplink (UL) slot 614a) as compared to using the first slot format pattern (for example, the fourth slot in sequence, shown as UL slot 606). Other examples may include additional or alternative changes. For example, the second configuration 608 may indicate an SBFD slot in place of what was an uplink slot in the first configuration 602 (for example, UL slot 606). In another example, the second configuration 608 may indicate a downlink slot or an uplink slot in place of what was an SBFD slot in the first configuration 602 (not shown in FIG. 6). In yet another example, the second configuration 608 may indicate a downlink slot or an uplink slot in place of what was an uplink slot or a downlink slot, respectively, in the first configuration 602. "SBFD slot" may refer to a slot in which an SBFD format is used. An SBFD format may include a slot format in which full-duplex communication is supported (for example, for both uplink and downlink communications), with one or more frequencies used for an uplink portion of the slot being separated from one or more frequencies used for a downlink portion of the slot by a guard band.

As used herein, "full-duplex time interval" may refer to a full-duplex slot, a full-duplex mini-slot (for example, one or more symbols within a slot associated with full-duplex operation), and/or a full-duplex OFDM symbol, among other examples. "Full-duplex" may refer to SBFD, in-band full-duplex, and/or other types of full-duplex operation. For example, "full-duplex slot" may refer to an SBFD slot, an in-band full-duplex slot, and/or a slot associated with another type of full-duplex operation. For example, a full-duplex time interval may be a time interval during which a network node 110 is operating in a full-duplex mode, as described in more detail elsewhere herein.

In some examples, the SBFD format may include a single uplink portion and a single downlink portion separated by a guard band. In some examples, the SBFD format may include multiple downlink portions and a single uplink portion that is separated from the multiple downlink portions by respective guard bands (for example, as shown in FIG. 6). In some examples, an SBFD format may include multiple uplink portions and a single downlink portion that is separated from the multiple uplink portions by respective guard bands. In some examples, the SBFD format may include multiple uplink portions and multiple downlink portions, where each uplink portion is separated from a downlink portion by a guard band. In some examples, operating using an SBFD mode may include activating or using a full-duplex mode in one or more slots based on, in response to, or otherwise associated with the one or more slots having the SBFD format. A slot may support the SBFD mode if an uplink bandwidth part (BWP) and a downlink BWP are permitted to be, or are, simultaneously active in the slot in an SBFD fashion (for example, with guard band separation).

By switching from the first configuration 602 to the second configuration 608, the network node 110 and the UE 120 may experience increased quality and/or reliability of communications. For example, the network node 110 and the UE 120 may experience increased throughput (for example, using a full-duplex mode), reduced latency (for example, the UE 120 may be able to transmit an uplink and/or a downlink communication sooner using the second configuration 608 rather than the first configuration 602), and increased network resource utilization (for example, by using both the downlink BWP and the uplink BWP simultaneously instead of only the downlink BWP or the uplink BWP). Although some aspects are described herein in terms of a slot-level granularity, as shown in FIG. 6, other granularities may be used, such as a sub-slot level granularity or a symbol level granularity, among other examples.

Figure 7:
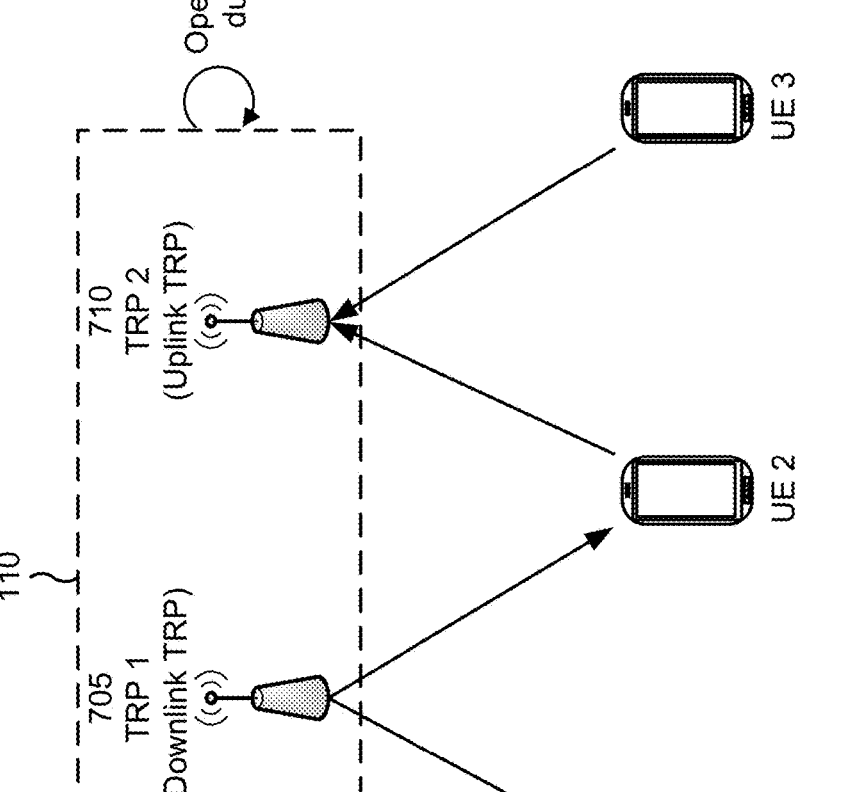
FIG. 7 is a diagram illustrating an example of a full-duplex operation at a network node in accordance with the present disclosure.

FIG. 7 is a diagram illustrating an example of a full-duplex operation 700 at a network node in accordance with the present disclosure. As shown in FIG. 7, a network node 110 may be associated with multiple TRPs, shown as a TRP 1 705 and a TRP 2 710. In a first operation 715, the network node 110 may operate in a full-duplex mode. For example, the network node 110 may transmit and receive communications (for example, via the multiple TRPs) at the same time.

As described elsewhere herein, the network node 110 operating in a full-duplex mode may experience self-interference. For example, a downlink transmission from the network node 110 may self-interfere with an uplink transmission to the network node 110. This may be caused by a variety of factors, such as the higher transmit power for the downlink transmission (as compared to the uplink transmission) and/or radio frequency bleeding, among other examples. Therefore, to improve spatial isolation, the network node 110 may use the TRP 1 705 for downlink signals and the second TRP 2 710 for uplink signals when operating in the full-duplex mode. For example, the TRP 1 705 and the TRP 2 710 may be spatially isolated from each other, thereby reducing a likelihood that a downlink transmission from the TRP 1 705 interferes with an uplink transmission to the TRP 2 710 (for example, when the downlink transmission and the uplink transmission at least partially overlap in the time domain). For example, improving a spatial isolation of the antennas and/or the TRPs used by the network node 110 during full-duplex operations may reduce self-interference associated with the full-duplex operations. Therefore, the TRP 1 705 may be unavailable for uplink operations and the TRP 2 710 may be unavailable for downlink operations while the network node 110 is operating in the full-duplex mode.

As shown in FIG. 7, the network node 110 may communicate with a UE 1 (for example, a UE 120), a UE 2 (for example, a UE 120), and a UE 3 (for example, a UE 120). The UE 1, the UE 2, and the UE 3 may each be operating in a non-full-duplex mode (for example, a half-duplex mode). In some cases, a UE (for example, the UE 1, the UE 2, and/or the UE 3) may experience poor performance for a given communication direction when the network node 110 is operating in the full-duplex mode because of the unavailability of a given TRP for uplink or downlink communications. For example, a serving TRP (for example, for downlink and uplink) for the UE 1 may be the TRP 1 705. The UE 1 may not support, or be capable of, having multiple active TCI states or beams. If the active TCI state or beam (for example, for uplink communications) associated with the UE 1 is associated with a spatial direction toward the TRP 1 705, then the UE 1 may be unable to transmit uplink communications during a full-duplex time interval (for example, because the TRP 1 705 is unavailable for uplink operations and the UE 1 is unable to support an additional active beam or TCI state associated with the TRP 2 710). Additionally or alternatively, a link between the UE 1 and the TRP 2 710 may be associated with poor radio conditions (for example, a large pathloss), resulting in poor performance of uplink communications transmitted by the UE 1 to the TRP 2 710.

As another example, the UE 3 may be associated with poor performance for downlink communications during a full-duplex time interval. For example, a serving TRP (for example, for downlink and uplink) for the UE 3 may be the TRP 2 710. The UE 3 may not support, or be capable of, having multiple active TCI states or beams. If the active TCI state or beam (for example, for downlink communications) associated with the UE 3 is associated with a spatial direction toward the TRP 2 710, then the UE 3 may not receive downlink communications during a full-duplex time interval (for example, because the TRP 2 710 is unavailable for downlink operations and the UE 3 is unable to support an additional active beam or TCI state associated with the TRP 1 705). Additionally or alternatively, a link between the UE 3 and the TRP 1 705 may be associated with poor radio conditions (for example, a large pathloss), resulting in poor performance of downlink communications transmitted by the TRP 1 705 to the UE 3.

For example, the UE 1 and/or the UE 3 may need to switch TCI states for uplink and downlink communications during the full-duplex time intervals. This is associated with a large signaling overhead associated with the network node 110 indicating the new TCI state(s) to be used by the UE 1 and/or the UE 3. Further, there may be a delay (for example, associated with an application time and/or processing time of a TCI state or beam indication) before the UE 1 and/or the UE 3 can apply the new TCI state(s). As a result, the UE 1 and/or the UE 3 may be unable to switch to the new TCI state(s) before an upcoming full-duplex time interval and/or before an upcoming scheduled communication.

In some examples, a UE (for example, the UE 1 or the UE 3) may rely on the network node 110 to refrain from scheduling communications in a communication direction associated with poor performance during the full-duplex time intervals (for example, the UE 1 may rely on the network node 110 refraining from scheduling uplink communications for the UE 1, and the UE 3 may rely on the network node 110 refraining from scheduling downlink communications for the UE 3). However, relying on the network node 110 for scheduling determinations may not be feasible or reliable in some situations. For example, some communications may be periodic and/or semi-persistent (for example, occurring every X slots, symbols, or milliseconds). The periodicity of these communications may not align with the slot format periodicity, resulting in some of the periodic and/or semi-persistent communications being scheduled to occur during a full-duplex time interval. Additionally, a full-duplex slot format may be dynamically configured for a UE, resulting in a periodic and/or semi-persistent communication, that would have otherwise occurred during a non-full-duplex time interval, being scheduled to occur during a full-duplex time interval.

As another example, a communication may be associated with one or more repetitions. For example, a PDSCH communication, a PDCCH communication, a PUSCH communication, and/or a physical uplink control channel (PUCCH) communication may be associated with one or more repetitions. Although the communication may be scheduled during a non-full-duplex time interval, a repetition of the communication may occur during a full-duplex time interval. Attempting to restrict repetitions from occurring during full-duplex time intervals may be associated with a high level of complexity and/or may restrict flexibility in scheduling a communication that is associated with repetitions. As another example, a single DCI communication may schedule multiple communications (for example, may schedule different transport blocks). Although one or more of the multiple communications may be scheduled during a non-full-duplex time interval, one or more other communications may occur during a full-duplex time interval. Attempting to restrict communications scheduled by a single DCI communication from occurring during full-duplex time intervals may be associated with a high level of complexity and/or may restrict flexibility in scheduling the multiple communication with the single DCI communication.

A UE may be unaware of the communication direction that may be associated with poor performance for the UE during full-duplex time intervals. Therefore, if the communication direction of a scheduled communication (for example, a periodic communication, a repetition of a communication, a communication from multiple communications scheduled by a single DCI, or another communication) is associated with poor performance for the UE during the full-duplex time intervals, then performance of the UE and/or the communication may suffer. For example, the UE may consume resources (for example, power resources, processing resources, and/or network resources) attempting to transmit or receive a communication (for example, associated with a given communication direction) to, or from, an antenna and/or TRP of the network node 110 that is unavailable for the given communication direction during full-duplex time intervals.

Various aspects relate generally to a disallowed communication direction for full-duplex time intervals. Some aspects more specifically relate to defining, for a UE, an allowable communication direction and/or a disallowed communication direction for full-duplex time intervals (for example, for slots and/or symbols associated with full-duplex operations). In some aspects, a network node may transmit, to a UE, an indication of a communication direction (and/or a channel and/or a reference signal) that is disabled or is to be dropped (for example, not received or transmitted) during slots or symbols that are associated with full-duplex operations at the network node. The UE may transmit or receive communications, during a full-duplex time interval, that are in an allowed communication direction (for example, that are not in the disallowed communication direction). In some aspects, the UE may refrain from transmitting or receiving (for example, may drop) a communication, during a full-duplex time interval, that is in the disallowed communication direction.

Particular aspects of the subject matter described in this disclosure can be implemented to realize one or more of the following potential advantages. In some examples, the described techniques can be used to clarify how full-duplex time intervals are to be utilized by the UE when the network node is operating in a full-duplex mode (for example, using non-co-located antennas and/or TRPs). For example, the UE, during full-duplex time intervals, may transmit or receive communications in an allowed communication direction and/or may drop communications in a disallowed communication direction. This may conserve resources (for example, power resources, processing resources, and/or network resources) of the UE that would have otherwise been used attempting to transmit or receive a communication in the disallowed communication direction (for example to, or from, an antenna and/or TRP of the network node that is unavailable for the disallowed communication direction during full-duplex time intervals).

In some aspects, a feedback operation for dropped communications associated with the disallowed communication direction may be defined. For example, when the UE does not receive a downlink communication (for example, because of the downlink being the disallowed communication direction), the UE may refrain from transmitting HARQ feedback for the downlink communication. The UE may therefore, for example, conserve power resources, processing resources, and/or network resources that would have otherwise been used by the UE transmitting the HARQ feedback for the downlink communication that the network node already knows was not transmitted to the UE.

In some aspects, the indication of the disallowed communication direction may be associated with a given CORE-SET pool index value. For example, the network node may transmit, and the UE may receive, an indication that communications associated with a given communication direction and with a given CORESET pool index value are disallowed, disabled, and/or to be dropped during full-duplex time intervals. This may enable improved control and/or flexibility for indicating disallowed communication directions (and/or allowed communication directions) in multi-TRP and/or mDCI scenarios. In some examples, rather than indicating that downlink or uplink is disabled for the full-duplex time intervals, the network node may transmit, and the UE may receive, an indication of one or more disallowed channels and/or one or more disallowed signal types for the full-duplex time intervals. This may provide additional flexibility for the network node to allow some communications (for example, higher priority communications) in what would otherwise be an entirely disallowed communication direction.

Figure 8:
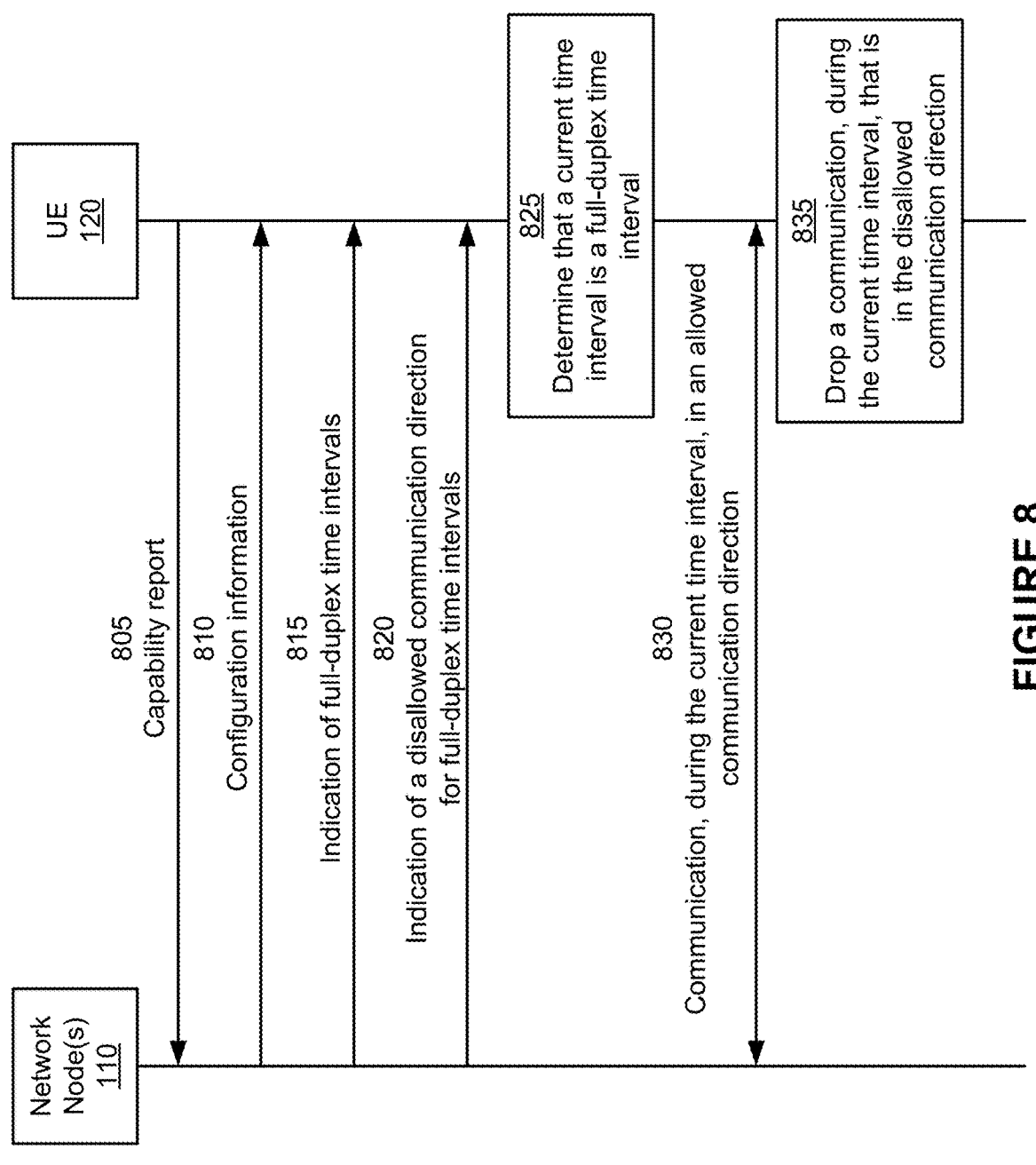
FIG. 8 is a diagram of an example associated with operations associated with a disallowed communication direction for full-duplex time intervals in accordance with the present disclosure.

FIG. 8 is a diagram of an example associated with operations 800 associated with a disallowed communication direction for full-duplex time intervals in accordance with the present disclosure. As shown in FIG. 8, one or more network nodes 110 (for example, a base station, a CU, a DU, and/or an RU) may communicate with a UE 120. In some aspects, the network node 110 and the UE 120 may be part of a wireless network (for example, the wireless network 100). The UE 120 and the network node 110 may have established a wireless connection prior to operations shown in FIG. 8. In some aspects, the network node 110 may be associated with two or more TRPs, antennas, and/or antenna panels. The two or more TRPs, antennas, and/or antenna panels may be non-co-located (for example, may be located in different physical locations and/or may be separated by a distance).

In a first operation 805, the UE 120 may transmit, and the network node 110 may receive, a capability report. The UE 120 may transmit the capability report via UE capability signaling, a UE assistance information (UAI) communication, an uplink control information communication, an RRC communication, a PUSCH, and/or a PUCCH, among other examples. The capability report may indicate UE support for one or more operations described herein. For example, the capability report may indicate whether the UE 120 supports receiving an indication of a disallowed communication direction (and/or an allowed communication direction) for full-duplex time intervals.

In some aspects, the capability report may indicate whether the UE 120 supports receiving an indication of one or more full-duplex time intervals, as described in more detail elsewhere herein. For example, the capability report may indicate whether the UE 120 supports identifying a slot pattern (for example, a slot format pattern) for full-duplex slots and/or symbols. In some aspects, the capability report may indicate whether the UE 120 supports selectively transmitting or receiving communications based on, in response to, or otherwise associated with an indicated disallowed communication direction during full-duplex time intervals. The capability report may indicate whether the UE 120 supports multiple active TCI states and/or multiple active beams. For example, the UE 120 may be configured to perform one or more operations described herein responsive to, based on, or otherwise associated with the capability report indicating that the UE 120 does not support multiple active TCI states and/or multiple active beams.

As used herein, "selectively" performing an operation means to either perform the operation or refrain from performing the operation. For example, selectively performing an operation based on, in response to, or otherwise associated with whether a condition is satisfied means that the operation is performed if the condition is satisfied and that the operation is not performed if the condition is not satisfied (or vice versa). Thus, selectively performing an operation may include determining whether to perform the operation and then either performing the operation or refraining from performing the operation based on, in response to, or otherwise associated with that determination.

As used herein, "selectively" performing a first operation or a second operation means to perform either the first operation or the second operation. For example, selectively performing a first operation or a second operation based on, in response to, or otherwise associated with whether a condition is satisfied means that the first operation is performed if the condition is satisfied and that the second operation is performed if the condition is not satisfied (or vice versa). Thus, selectively performing a first operation or a second operation may include determining whether to perform either the first operation or the second operation and then performing either the first operation or the second operation based on, in response to, or otherwise associated with that determination.

As used herein, "full-duplex" may refer to SBFD, in-band full-duplex (for example, with partially or fully overlapping frequency domain resources) and/or another full-duplex type or mode. "Time interval" may refer to a slot, an OFDM symbol, a mini-slot (for example, one or more symbols within a slot), and/or another time interval. For example, "full-duplex time interval" may refer to an SBFD slot, an SBFD symbol, an in-band full-duplex slot, and/or an in-band full-duplex symbol, among other examples.

The network node 110 may configure the UE 120 in accordance with the capability report. For example, the network node 110 may configure, or may trigger, the UE 120 to perform one or more operations based on, in response to, or otherwise associated with the capability report indicating that the UE 120 supports the one or more operations. For example, the network node 110 may indicate a disallowed communication direction for full-duplex slots based on, in response to, or otherwise associated with the capability report indicating that the UE 120 supports such indications and/or indicating that the UE 120 supports identifying the full-duplex time intervals.

In a second operation 810, the network node 110 may transmit, and the UE 120 may receive, configuration information. In some aspects, the UE 120 may receive the configuration information via one or more of system information signaling, RRC signaling, one or more MAC-CEs, and/or DCI, among other examples. In some aspects, the configuration information may include an indication of one or more configuration parameters for selection by the UE 120, and/or explicit configuration information for the UE 120 to use to configure itself, among other examples.

In some aspects, the configuration information may indicate that the UE 120 is to receive an indication of a disallowed communication direction for full-duplex time intervals. A full-duplex time interval may be a time interval during which a network node 110 is operating in a full-duplex mode, as described in more detail elsewhere herein. A disallowed communication direction may be a communication direction (for example, uplink or downlink) for which the UE 120 is to drop communications. As used herein, to "drop" a communication, or "dropping" a communication, may refer to a device (for example, the UE 120) refraining from transmitting or receiving the communication. In some aspects, the configuration information may indicate that the UE 120 is to drop communications associated with the disallowed communication direction that at least partially overlap, in the time domain, with a full-duplex time interval. In some aspects, the configuration information may indicate that the UE 120 is to drop communications associated with the disallowed communication direction that are fully contained, in the time domain, within a full-duplex time interval.

In some aspects, the configuration information may indicate that one or more full-duplex time intervals are to be used by the network node 110 and/or the UE 120. For example, the configuration information may indicate that full-duplex operations are enabled for the network node 110. The full-duplex operations performed by the network node 110 may include subband-full-duplex operations and/or in-band full-duplex operations (for example, associated with partially or fully overlapping frequency domain resources). For example, the network node 110 may use a first TRP and/or a first antenna panel for receiving uplink signals at the same time as using a second TRP and/or a second antenna panel for transmitting downlink signals.

In some aspects, the configuration information may include an indication of one or more full-duplex time intervals. For example, the configuration information may indicate a pattern of time intervals associated with full-duplex operations at the network node 110. For example, the configuration information may indicate one or more time intervals during which the network node 110 is operating in a full-duplex mode. For example, the configuration information may indicate a slot pattern. For example, the configuration information may include a TDD configuration. The slot pattern may indicate a duplex type or duplex mode for respective slots. For example, the slot pattern may indicate a pattern of uplink slots, downlink slots, and/or full-duplex slots (for example, subband-full-duplex slots).

In some aspects, the configuration information may include an indication of a disallowed communication direction associated with the one or more full-duplex time intervals. For example, the indication of the disallowed communication direction may be associated with either uplink signals and channels or downlink signals and channels being disallowed for the one or more full-duplex time intervals. The disallowed communication direction may be either uplink or downlink. For example, the disallowed communication direction may be associated with either downlink channels and/or signals, or uplink channels and/or signals, being disabled or dropped during full-duplex time intervals.

In some aspects, the indication of the disallowed communication direction may be an explicit indication. For example, the indication of the disallowed communication direction may include an indication of a communication direction (for example, uplink or downlink) that is not to be used by the UE 120 during full-duplex time intervals. As another example, the indication of the disallowed communication direction may be an implicit indication. For example, the indication of the disallowed communication direction may include an indication of an allowed communication direction for full-duplex time intervals. Because there may be only two communication directions associated with the network node 110 (for example, uplink or downlink), the UE 120 may determine the disallowed communication direction based on, in response to, or otherwise associated with the indication of the allowed communication direction. For example, if the indicated allowed communication direction is uplink, then the UE 120 may determine that the disallowed communication direction for full-duplex time intervals is downlink. If the indicated allowed communication direction is downlink, then the UE 120 may determine that the disallowed communication direction for full-duplex time intervals is uplink. In examples where the indication of the disallowed communication direction is an explicit indication, the UE 120 may determine the allowed communication direction for full-duplex time intervals in a similar manner. The indication of the disallowed communication direction is described in more detail elsewhere herein.

In some aspects, the configuration information may indicate one or more TCI states. For example, the configuration information may indicate, for a given TCI state, (for example, via a TCI state information element) a TCI state identification (such as a tci-StateID), a QCL type (such as a qcl-Type 1, qcl-Type2, qcl-TypeA, a qcl-TypeB, a qcl-TypeC, or a qcl-TypeD), a cell identification (such as a ServCellIndex), a bandwidth part identification (such as a bwp-Id), and/or a reference signal identification (such as an NZP-CSI-RS-ResourceId or an SSB-Index), among other examples. The one or more TCI states may include a unified TCI state (for example, an uplink TCI state and a downlink TCI state, or a joint uplink and downlink TCI state). For example, a TCI state may indicate a directionality or a characteristic of a beam, such as one or more quasi co-location (QCL) properties of the downlink beam. A QCL property may include, for example, a Doppler shift, a Doppler spread, an average delay, a delay spread, or spatial receive parameters, among other examples. For example, the UE 120 may receive an indication (for example, a beam indication, a MAC-CE communication, and/or a DCI communication) to use a TCI state (for example, a unified TCI state) for a given TRP of the network node 110.

The UE 120 may configure itself based at least in part on the configuration information. In some aspects, the UE 120 may be configured to perform one or more operations described herein based at least in part on the configuration information.

In a third operation 815, the network node 110 may transmit, and the UE 120 may receive, an indication of one or more full-duplex time intervals. In some aspects, the third operation 815 may be performed as part of the second operation 810 (for example, the indication of one or more full-duplex time intervals may be included in the configuration information, as described above). In other examples, the third operation 815 and the second operation 810 may be separate operations. In some aspects, the UE 120 may receive a TDD pattern indicating a slot format pattern. The slot pattern may indicate one or more full-duplex slots. The slot format pattern may repeat over time. For example, the UE 120 may receive the indication of one or more full-duplex time intervals via a slot format pattern in a similar manner as described in connection with FIG. 6. A slot is described above as an example of a time interval and the UE 120 may receive an indication of other full-duplex time intervals in a similar manner.

In some aspects, the network node 110 may transmit, and the UE 120 may receive, an indication to switch to a slot format pattern that includes full-duplex slots. For example, the network node 110 may transmit, and the UE 120 may receive, a communication (for example, an RRC communication, a MAC-CE communication, and/or a DCI communication) that indicates that the UE 120 is to switch from a first slot format pattern (for example, that does not include full-duplex slots) to a second slot format pattern (for example, that does include full-duplex slots). The UE 120 may identify one or more full-duplex time intervals based on, in response to, or otherwise associated with the pattern (for example, the slot format pattern). In other words, the UE 120 may identify one or more time intervals during which the network node 110 is operating in a full-duplex mode.

In some aspects, the network node 110 may determine a disallowed communication direction (and/or channel(s) or signal type(s)) for full-duplex time intervals for the UE 120. For example, the network node 110 may determine a serving TRP (or TRPs) associated with the UE 120. The serving TRP(s) may be TRP(s) that the UE 120 is using to communicate with the network node 110. The network node 110 may determine communication directions to be used for respective TRPs when the network node 110 is operating in a full-duplex mode. For example, the network node 110 may be associated with a first TRP and a second TRP. The network node 110 may determine that, when operating in the full-duplex mode, the first TRP is to be used for uplink and the second TRP is to be used for downlink. The network node 110 may determine that the serving TRP of the UE 120 is the first TRP. Additionally, the network node 110 may determine that the UE 120 is not capable of supporting multiple active TCI states (for example, as indicated by the capability report transmitted by the UE 120 in the first operation 805) and/or that a communication parameter (for example, an RSRP, a signal-to-noise ratio (SNR), or another parameter) of a link between the UE 120 and the second TRP does not satisfy a threshold. Therefore, the network node 110 may determine that the UE 120 is not capable of receiving downlink communications from the second TRP and/or that a link between the UE 120 and the second TRP is not suitable for downlink transmissions. Therefore, the network node 110 may determine that downlink is disallowed for the UE 120 during full-duplex time intervals (for example, and the UE 120 may be enabled to continue to transmit uplink communications to the first TRP).

In some aspects, such as in multi-TRP scenarios, the network node 110 may determine a disallowed communication direction for respective TRPs. For example, the network node 110 may determine that downlink is to be disabled for the first TRP and that uplink is to be disabled for the second TRP during full-duplex time intervals. The network node 110 may indicate, as described in more detail elsewhere herein, a disabled communication direction for respective CORESET pool index values to disable the communication direction for respective TRPs during full-duplex time intervals.

In a fourth operation 820, the network node 110 may transmit, and the UE 120 may receive, an indication of a disallowed communication direction associated with full-duplex time intervals. The indication of the disallowed communication direction may be included in a higher layer parameter (for example, an RRC parameter or a MAC parameter) received by the UE 120. In some aspects, the indication of the disallowed communication direction may be communicated via RRC signaling. MAC-CE signaling, DCI signaling, or another type of signaling.

The indication of the disallowed communication direction may be associated with either uplink signals and channels or downlink signals and channels being disallowed for the one or more full-duplex time intervals. That is, the disallowed communication direction may be an uplink direction (for example, uplink signals and channels) or a downlink direction (for example, downlink signals and channels) and the indication of the disallowed communication direction may indicate the disallowed communication direction. As described elsewhere herein, the indication of the disallowed communication direction may be an explicit indication or an implicit indication. For example, the indication of the disallowed communication direction may include an indication of a communication direction (for example, uplink or downlink) that is not to be used by the UE 120 during full-duplex time intervals. As another example, the indication of the disallowed communication direction may include an indication of an allowed communication direction for full-duplex time intervals.

In some aspects, the disallowed communication direction may be applicable to all channels and/or signal types associated with the disallowed communication direction. For example, the UE 120 may drop all communications and/or signals in the disallowed communication direction during full-duplex time intervals. In other aspects, the disallowed communication direction may be applicable to certain channels and/or signal types. For example, one or more channels and/or signal types, associated with the communication direction, may be disabled or dropped during full-duplex time intervals. In some aspects, the network node 110 may transmit, and the UE 120 may receive, an indication of one or more channels and/or signal types that are associated with the disallowed communication direction.

In some aspects, the indication of the disallowed communication direction may be an indication of the one or more channels and/or the one or more signal types that are disallowed for full-duplex time intervals. For example, rather than indicating that downlink or uplink is disabled for the full-duplex time intervals, the network node 110 may transmit, and the UE 120 may receive, an indication of one or more disallowed channels and/or one or more disallowed signal types for the full-duplex time intervals. This may provide additional flexibility for the network node 110 to allow some communications (for example, higher priority communications) in what would otherwise be an entirely disallowed communication direction. For example, the UE 120 may transmit a higher priority communication (for example, in the otherwise disallowed communication direction) and the network node 110 (for example, a TRP of the network node 110) may perform interference mitigation to receive the higher priority communication.

In some aspects, the network node 110 may transmit, and the UE 120 may receive, an indication that one or more channels and/or signal types, in the disallowed communication direction, are to be disabled or dropped by the UE 120 during full-duplex time intervals. For example, the one or more channels may include a PUSCH or a PUCCH (for example, if the disallowed communication direction is uplink). As another example, the one or more channels may include a PDSCH or a PDCCH (for example, if the disallowed communication direction is downlink).

The one or more signal types may include semi-persistent and/or periodic signals. For example, the one or more signal types may include semi-persistent scheduling (SPS) signals, configured grant (CG) signals, semi-persistent and/or periodic sounding reference signals (SRSs), semi-persistent and/or periodic channel state information (CSI) communicated via the PUCCH, and/or semi-persistent and/or periodic CSI reference signals (CSI-RSs), among other examples. Additionally or alternatively, the one or more signal types may include repetitions. For example, repetitions of PDSCH communications, PDCCH communications, PUCCH communications, and/or PUSCH communications in the disallowed communication direction may be disabled or dropped during full-duplex time intervals. For example, semi-persistent and/or periodic signals or repetitions may be dropped because the communications may be transmitted to the UE 120 again at a later time and/or may have already been transmitted to the UE 120. Therefore, these signal types may be more tolerant to being dropped at a given occasion because the same communication may be transmitted to the UE 120 in another occasion. Additionally or alternatively, the one or more signal types may include signals associated with a communication that is scheduled by a single DCI communication that schedules multiple communications. For example, the one or more signal types may include signals associated with PDSCH signals or PUSCH signals that are scheduled by one DCI scheduling multiple PDSCH signals or PUSCH signals. The described channels and signal types are provided as examples. Other channels and/or signal types may be disabled for the disallowed communication direction in a similar manner as described herein.

In some aspects, the indication of the disallowed communication direction may include an indication of a CORESET pool index value associated with the indication of the disallowed communication direction. For example, channels and/or signals, associated with a given CORESET pool index value, may be disabled or dropped in the disallowed communication direction during full-duplex time intervals. For example, the indication of the disallowed communication direction may include an indication that downlink channels and/or signals associated with a CORESET pool index 0 are disabled or disallowed, uplink channels and/or signals associated with a CORESET pool index 0 are disabled or disallowed, downlink channels and/or signals associated with a CORESET pool index 1 are disabled or disallowed, and/or uplink channels and/or signals associated with a CORESET pool index 1 are disabled or disallowed, among other examples. For example, if two TRPs of the network node 110 are used for the full-duplex operations, then during full-duplex time intervals, uplink transmission to one of the TRPs and downlink transmissions from the other TRP may not be possible or allowed. Therefore, multi-DCI multi-TRP operations may not be possible during full-duplex time intervals. The network node 110 may indicate the disallowed communication direction per CORE- SET pool index value to indicate which TRP is to be associated with which communication direction.

For example, the UE 120 may be communicating via multiple TRPs (for example, a TRP 1 and a TRP 2) during non-full-duplex time intervals (for example, communicating using multiple TCI states corresponding to respective TRPs). The TRP 1 may be associated with a first CORESET pool index value and the TRP 2 may be associated with a second CORESET pool index value. In some aspects, the network node 110 may transmit, and the UE 120 may receive, an indication of a first disallowed communication direction for communications associated with a first CORESET pool index value and an indication of a second disallowed communication direction for communications associated with a second CORESET pool index value. For example, the network node 110 may use the TRP 1 for uplink operations and the TRP 2 for downlink operations when operating in the full-duplex mode. Therefore, the indication of the disallowed communication direction may indicate that downlink is disallowed for the first CORESET pool index value (for example, for the TRP 1) and/or that uplink is disallowed for the second CORESET pool index value (for example, for the TRP 2). This may provide additionally flexibility for the network node 110 to indicate which TRPs are associated with which communication directions during full-duplex time intervals, in scenarios where the network node 110 is communicating using multi-TRP operations.

In some aspects, the indication of the disallowed communication direction may include an indication of a TCI state associated with a full-duplex operating state and the disallowed communication direction where the TCI state indicates that the disallowed communication direction is disallowed for the one or more full-duplex time intervals. For example, the UE 120 may support TCI states associated with different duplex states of the network node 110. For example, a TCI state may include an indication of an associated duplex type or duplex mode. The UE 120 may apply the TCI state during time intervals associated with the duplex type or duplex mode that is associated with the TCI state. For example, the UE 120 may apply a full-duplex TCI state during full-duplex time intervals and may apply a non-full-duplex TCI state during non-full-duplex time intervals. This may reduce a signaling overhead associated with switching a TCI state used by the UE 120 when the network node changes duplex states or duplex types. In some examples, an amount of time associated with the UE 120 switching to the TCI state associated with a given duplex state or duplex type may be reduced because a processing time associated with receiving a beam indication (for example, receiving an indication of the TCI state) may be reduced or eliminated. Configuring a TCI state to be associated with a given duplex state or duplex type (for example, full-duplex or half-duplex) may reduce self-interference at the network node 110 by enabling the network node to use spatially isolated antennas and/or TRPs for respective communication directions, while also reducing a signaling overhead associated with the network node indicating to the UE 120 to use the TCI state that enables the spatial isolation.

In some aspects, the network node 110 may transmit, and the UE 120 may receive, a communication (for example, a MAC-CE communication and/or a DCI communication) that activates a TCI state associated with full-duplex. The TCI state may be associated with a communication direction (for example, uplink or downlink). The TCI state may include an indication that the communication direction is disallowed for the one or more full-duplex time intervals. For example, the TCI state may include a "null" indication or a "disable" indication. In other words, the TCI state may include a flag or other indication that indicates that the TCI state is not to be used for communications (for example, thereby indicating that the communication direction associated with the TCI state is disabled or disallowed for full-duplex time intervals). For example, the network node 110 may transmit, and the UE 120 may receive, an indication of a first unified TCI state (for example, a downlink TCI state 1 and an uplink TCI state 1) associated with non-full-duplex time intervals. The network node 110 may transmit, and the UE 120 may receive, an indication of a second unified TCI state associated with full-duplex time intervals. The second unified TCI state may include a "null" TCI state for a given communication direction, indicating that the communication direction is disabled for full-duplex time intervals. For example, the second unified TCI state may include the downlink TCI state 1 and a "null" uplink TCI state, indicating that uplink is disallowed or disabled for full-duplex time intervals.

In some aspects, the TCI state associated with full-duplex may be associated with a given CORESET pool index value. For example, the network node 110 may transmit, and the UE 120 may receive an indication of a "null" TCI state (for example, that is associated with the full-duplex time intervals) associated with a given communication direction and associated with a given CORESET pool index value. For example, for a first CORESET pool index value, a beam indication may indicate that a first unified TCI state (for example, a downlink TCI state 1 and an uplink TCI state 1) is to be used for non-full-duplex time intervals and that a second unified TCI state (for example, the downlink TCI state 1 and a "null" uplink TCI state) is to be used for full-duplex time intervals. For a second CORESET pool index value, a beam indication may indicate that a third unified TCI state (for example, a downlink TCI state 2 and an uplink TCI state 2) is to be used for non-full-duplex time intervals and that a fourth unified TCI state (for example, a "null" downlink TCI state and the uplink TCI state 2) is to be used for full-duplex time intervals. This may indicate that, during full-duplex time intervals, uplink is disabled or disallowed for a first TRP associated with the first CORESET pool index value and that downlink is disabled or disallowed for a second TRP associated with the second CORESET pool index value.

In a fifth operation 825, the UE 120 may determine that a current time interval is a full-duplex time interval. For example, based on, in response to, or otherwise associated with the indication of the one or more full-duplex time intervals (for example, received by the UE 120 as part of the second operation 810 and/or the third operation 815), the UE 120 may determine that the current time interval is associated with full-duplex. For example, the UE 120 may determine that the current time interval is a full-duplex slot, a subband-full-duplex slot, or another full-duplex time interval.

In a sixth operation 830, the UE 120 and the network node 110 may communicate via an allowed communication direction during the current time interval (for example, during a full-duplex time interval). The UE 120 may determine the allowed communication direction based on, in response to, or otherwise associated with the indication of the disallowed communication direction (for example, received by the UE 120 as part of the second operation 810 and/or the fourth operation 820). For example, the indication of the disallowed communication direction may include an explicit indication of the allowed communication direction. In some other aspects, the UE 120 may determine the allowed communication direction based on, in response to, or otherwise associated with the disallowed communication direction (for example, if the disallowed communication direction is downlink, then the UE 120 may determine that the allowed communication direction is uplink, or vice-versa). The UE 120 may transmit or receive, during the current time interval (for example, during a full-duplex time interval), a communication in accordance with the communication being in a communication direction that is not the disallowed communication direction (for example, based on, in response to, or otherwise associated with the communication being in the allowed communication direction).

In some aspects, the UE 120 may determine whether a channel and/or a signal type associated with a communication is allowable for full-duplex time intervals. For example, the indication of the disallowed communication direction may indicate one or more channels and/or one or more signal types that are disallowed or disabled for full-duplex time intervals. The UE 120 may transmit or receive, during the current time interval (for example, during a full-duplex time interval), a communication in accordance with the communication being associated with a channel and/or signal type that is not disallowed or disabled for full-duplex time intervals.

In a seventh operation 835, the UE 120 may drop, during the current time interval (for example, during a full-duplex time interval), a communication in accordance with the communication being in the disallowed communication direction. For example, the UE 120 may identify a communication that is scheduled or configured to occur during the full-duplex time interval. The UE 120 may refrain from transmitting (for example, if the disallowed communication direction is uplink) or refrain from receiving (for example, if the disallowed communication direction is downlink) the communication based on, in response to, or otherwise associated with the communication being in the disallowed communication direction. Additionally or alternatively, the UE 120 may drop, during the current time interval (for example, during a full-duplex time interval), a communication in accordance with the communication being associated with a disallowed channel and/or a disallowed signal type. Similarly, the network node 110 may drop, during the current time interval (for example, during a full-duplex time interval), a communication in accordance with the communication being in the disallowed communication direction. For example, the network node 110 may identify a communication that is scheduled or configured to occur during the full-duplex time interval. The network node 110 may refrain from transmitting (for example, if the disallowed communication direction is downlink) or refrain from receiving (for example, if the disallowed communication direction is uplink) the communication based on, in response to, or otherwise associated with the communication being in the disallowed communication direction.

In some aspects, a feedback operation for communications (for example, downlink communications or PDSCH communications) that are dropped by the UE 120 in accordance with the disallowed communication direction for full-duplex time intervals. The feedback operation may be indicated and/or configured as part of the second operation 810. For example, the UE 120 may support hybrid automatic repeat request (HARQ) feedback codebook transmissions. A HARQ feedback codebook transmission may include a feedback message that the UE 120 is to transmit to the network node 110 to provide feedback regarding, for example, downlink data transmissions (for example, transmissions associated with a PDSCH).

The UE may be configured with different types of codebooks, such as a Type-1 HARQ acknowledgement (ACK) codebook or a Type-2 HARQ ACK codebook. The Type-1 HARQ ACK codebook may be referred to as a semi-static HARQ ACK codebook. For example, the Type-1 HARQ ACK codebook may be associated with a fixed, or static, size (for example, that is configured by the network node 110). The Type-2 HARQ ACK codebook may be associated with a dynamic size (for example, where the size of the Type-2 HARQ ACK codebook is based at least in part on, or otherwise associated with, scheduling received by the UE 120). Typically, if the UE 120 is configured to transmit a Type-1 HARQ ACK codebook, the UE 120 may collect feedback for PDSCH communications that are attempted to be received by the UE 120 during a feedback window (for example, k slots), and may transmit the Type-1 HARQ ACK codebook indicating feedback (for example, ACK/NACK feedback) associated with the PDSCH communications that are attempted to be received by the UE 120 during the feedback window.

In some aspects, the UE 120 may refrain from transmitting a HARQ feedback indication associated with a downlink communication that is dropped in accordance with the disallowed communication direction (for example, that is dropped as part of the seventh operation 835). For example, the UE 120 may not report HARQ-ACK for the downlink communication (for example, for the PDSCH). In examples where the UE 120 is configured to transmit a Type-1 HARQ ACK codebook, the UE 120 may exclude a candidate PDSCH occasion from the Type-1 HARQ ACK codebook that is associated with the full-duplex time interval. For example, the UE 120 may transmit, and the network node 110 may receive, a Type-1 HARQ codebook that is associated with a set of downlink occasions (for example, a set of candidate PDSCH occasions) including a downlink occasion corresponding to the downlink communication. The Type-1 HARQ codebook may not include an indication for the downlink occasion corresponding to the dropped downlink communication. For example, a candidate PDSCH occasion from a time domain resource assignment (TDRA) row that overlaps with time domain resources of the full-duplex time interval may be excluded from (for example, not included in) the Type-1 HARQ codebook. In examples where the disallowed communication direction is also associated with a CORESET pool index value, the UE 120 may exclude a candidate PDSCH occasion, associated with the CORESET pool index value, from a TDRA row that overlaps with time domain resources of the full-duplex time interval in a Type-1 HARQ codebook for the CORESET pool index value. This may reduce a size of the Type-1 HARQ codebook, thereby conserving network resources associated with transmitting the Type-1 HARQ codebook. The network node 110 may determine that the downlink communication was not successfully received by the UE 120 based on, in response to, or otherwise associated with the downlink communication being scheduled or configured to occur during a full-duplex time interval and based on, in response to, or otherwise associated with the disallowed communication direction for the UE 120.

In other aspects, the UE 120 may transmit, and the network node 110 may receive, a HARQ feedback indication for a downlink communication that is dropped in accordance with the disallowed communication direction (for example, that is dropped as part of the seventh operation 835). For example, the UE 120 may transmit a negative ACK (NACK) indication for the downlink communication (for example, in a Type-1 HARQ codebook or another type of feedback communication). This may indicate to the network node 110 that the downlink communication was not successfully received by the UE 120. Therefore, the network node 110 may schedule another transmission of the downlink communication to ensure that the UE 120 receives the downlink communication, thereby improving a reliability of downlink communications that are dropped in accordance with the disallowed communication direction.

Figure 9:
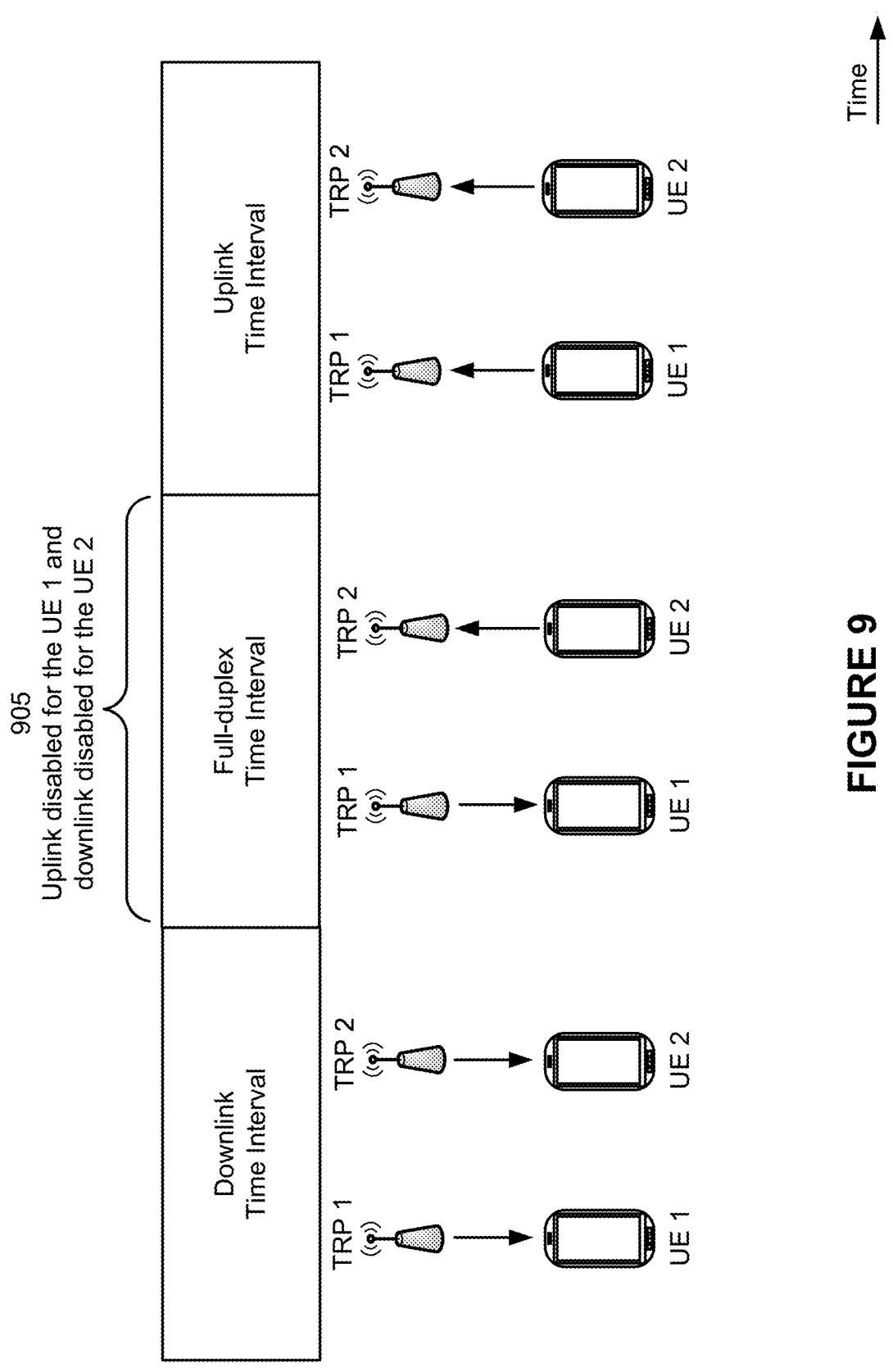
FIG. 9 is a diagram of an example associated with a disallowed communication direction for full-duplex time intervals in accordance with the present disclosure.

FIG. 9 is a diagram of an example associated with a disallowed communication direction for full-duplex time intervals in accordance with the present disclosure. As shown in FIG. 9, a UE 1 (for example, a UE 120) and a UE 2 (for example, a UE 120) may be configured with, or may receive an indication of, time intervals (for example, slots or symbols) associated with different duplex types. For example, some time intervals may be non-full-duplex time intervals (for example, downlink time intervals or uplink time intervals). Other time intervals may be full-duplex time intervals (for example, a subband-full-duplex time interval). The UE 1 and/or the UE 2 may receive the indication of the different types of time intervals in a similar manner as described in more detail elsewhere herein, such as in connection with the second operation 810 and/or the third operation 815.

As an example, a network node 110 may be associated with multiple TRPs, such as a TRP 1 and a TRP 2. As described elsewhere herein, when operating in a full-duplex mode, the network node 110 may use the TRP 1 for downlink operations and may use the TRP 2 for uplink operations. As shown in FIG. 9, the UE 1 may communicate with the network node 110 via the TRP 1. For example, the UE 1 may communicate both uplink signals (for example, during the uplink time interval) and downlink signals (for example, during the downlink time interval) via the TRP 1. Similarly, the UE 2 may communicate with the network node 110 via the TRP 2. For example, the UE 2 may communicate both uplink signals (for example, during the uplink time interval) and downlink signals (for example, during the downlink time interval) via the TRP 2. In other words, the TRP 1 may be a serving TRP for the UE 1 and the TRP 2 may be a serving TRP for the UE 2. For example, the UE 1 may use a TCI state (for example, a downlink TCI state, an uplink TCI state, and/or a joint uplink and downlink TCI state) that is associated with a spatial direction toward the TRP 1 to transmit and/or receive signals. Similarly, the UE 2 may use a TCI state (for example, a downlink TCI state, an uplink TCI state, and/or a joint uplink and downlink TCI state) that is associated with a spatial direction toward the TRP 2 to transmit and/or receive signals.

In a first operation 905, uplink may be disabled for the UE 1 and downlink may be disabled for the UE 2 for full-duplex time intervals. For example, the UE 1 may receive an indication that uplink is a disallowed communication direction for full-duplex time intervals (for example, in a similar manner as described elsewhere herein). For example, because the TRP 1 is the serving TRP of the UE 1 and because the network node 110 uses the TRP 1 for downlink operations (for example, only downlink operations) when operating in a full-duplex mode, the network node 110 may transmit, and the UE 1 may receive, an indication that uplink channels and/or signals are disabled or disallowed for the full-duplex time intervals.

Additionally, the UE 2 may receive an indication that downlink is a disallowed communication direction for full-duplex time intervals (for example, in a similar manner as described elsewhere herein). For example, because the TRP 2 is the serving TRP of the UE 2 and because the network node 110 uses the TRP 2 for uplink operations (for example, only uplink operations) when operating in a full-duplex mode, the network node 110 may transmit, and the UE 2 may receive, an indication that downlink channels and/or signals are disabled or disallowed for the full-duplex time intervals.

For example, as shown in FIG. 9, the UE 1 may receive downlink communications and may drop uplink communications during the full-duplex time interval. The UE 2 may transmit uplink communications and may drop downlink communications during the full-duplex time interval. This may ensure that the UE 1 does not consume resources (for example, processing resources, battery resources, and/or network resources) associated with transmitting uplink communications to the TRP 1 when the TRP 1 is being used only for downlink operations by the network node 110. Similarly, this may ensure that the UE 2 does not consume resources (for example, processing resources, battery resources, and/or network resources) associated with attempting to receive downlink communications (for example, monitoring for downlink communications) from the TRP 2 when the TRP 2 is being used only for uplink operations by the network node 110.

Figure 10:
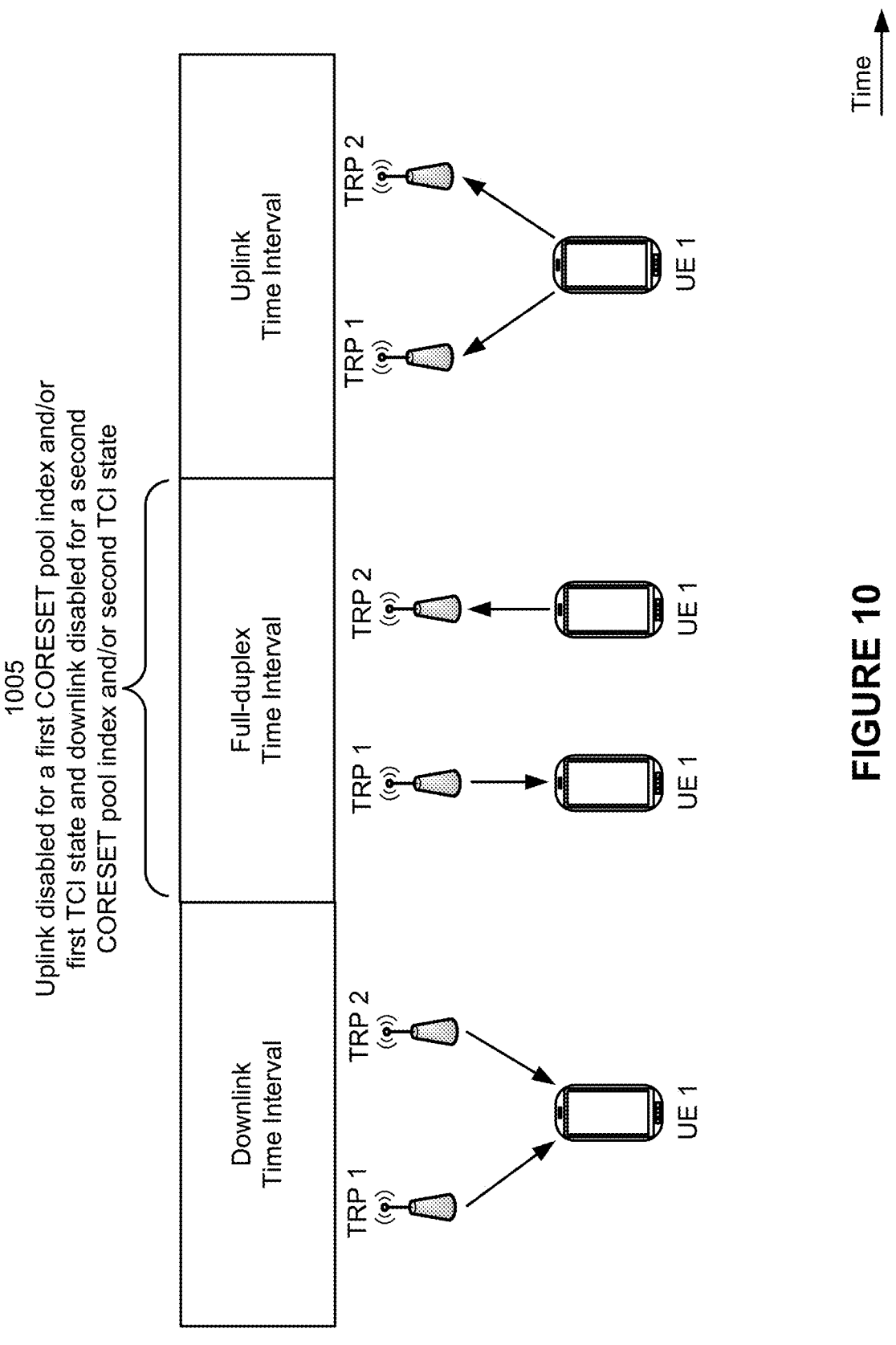
FIG. 10 is a diagram of an example associated with a disallowed communication direction for full-duplex time intervals in accordance with the present disclosure.

FIG. 10 is a diagram of an example associated with a disallowed communication direction for full-duplex time intervals in accordance with the present disclosure. As shown in FIG. 10, a UE 1 (for example, a UE 120) may be configured with, or may receive an indication of, time intervals (for example, slots or symbols) associated with different duplex types. For example, some time intervals may be non-full-duplex time intervals (for example, downlink time intervals or uplink time intervals). Other time intervals may be full-duplex time intervals (for example, a subband-full-duplex time interval). The UE 1 may receive the indication of the different types of time intervals in a similar manner as described in more detail elsewhere herein, such as in connection with the second operation 810 and/or the third operation 815.

As an example, a network node 110 may be associated with multiple TRPs, such as a TRP 1 and a TRP 2. As described elsewhere herein, when operating in a full-duplex mode, the network node 110 may use the TRP 1 for downlink operations and may use the TRP 2 for uplink operations. As shown in FIG. 10, the UE 1 may communicate using a multi-TRP operation. For example, the UE 1 may receive downlink communications from both the TRP 1 and the TRP 2 during downlink time intervals. The UE 1 may transmit uplink communications to both the TRP 1 and the TRP 2 during uplink time intervals.

In a first operation 1005, uplink may be disabled for a CORESET pool index and/or TCI state associated with the TRP 1 and downlink may be disabled for a CORESET pool index and/or TCI state associated with the TRP 2 for full-duplex time intervals. For example, the UE 1 may receive an indication that uplink is disabled for a first CORESET pool index value and/or for a first TCI state (for example, that is associated with the TRP 1) for full-duplex time intervals (for example, in a similar manner as described elsewhere herein). For example, because the network node 110 uses the TRP 1 for downlink operations (for example, only downlink operations) when operating in a full-duplex mode, the network node 110 may transmit, and the UE 1 may receive, an indication that uplink channels and/or signals are disabled or disallowed for the full-duplex time intervals for the TRP 1 (for example, by indicating the first CORESET pool index value and/or by indicating an uplink "null" TCI state associated with the TRP 1).

Similarly, the UE 1 may receive an indication that downlink is disabled for a second CORESET pool index value and/or for a second TCI state (for example, that is associated with the TRP 2) for full-duplex time intervals (for example, in a similar manner as described elsewhere herein). For example, because the network node 110 uses the TRP 2 for uplink operations (for example, only uplink operations) when operating in a full-duplex mode, the network node 110 may transmit, and the UE 1 may receive, an indication that downlink channels and/or signals are disabled or disallowed for the full-duplex time intervals for the TRP 2 (for example, by indicating the second CORESET pool index value and/or by indicating a downlink "null" TCI state associated with the TRP 2).

FIG. 11 is a flowchart illustrating an example process 1100 performed, for example, by a UE that supports a disallowed communication direction for full-duplex time intervals in accordance with the present disclosure. Example process 1100 is an example where the UE (for example, the UE 120) performs operations associated with a disallowed communication direction for full-duplex time intervals.

As shown in FIG. 11, in some aspects, process 1100 may include receiving. from a network node, an indication of one or more full-duplex time intervals (block 1110). For example, the UE (such as by using communication manager 140 or reception component 1302, depicted in FIG. 13) may receive, from a network node, an indication of one or more full-duplex time intervals, as described above.

As further shown in FIG. 11, in some aspects, process 1100 may include receiving, from the network node, an indication of a disallowed communication direction associated with the one or more full-duplex time intervals (block 1120). For example, the UE (such as by using communication manager 140 or reception component 1302, depicted in FIG. 13) may receive, from the network node, an indication of a disallowed communication direction associated with the one or more full-duplex time intervals, as described above.

As further shown in FIG. 11, in some aspects, process 1100 may include transmitting or receiving, to or from the network node and during a full-duplex time interval of the one or more full-duplex time intervals, a communication in accordance with the communication being in a communication direction that is not the disallowed communication direction (block 1130). For example, the UE (such as by using communication manager 140, or transmission component 1304, or reception component 1302, depicted in FIG. 13) may transmit or receive, to or from the network node and during a full-duplex time interval of the one or more full-duplex time intervals, a communication in accordance with the communication being in a communication direction that is not the disallowed communication direction, as described above.

Process 1100 may include additional aspects, such as any single aspect or any combination of aspects described below or in connection with one or more other processes described elsewhere herein.

In a first additional aspect, the indication of the disallowed communication direction may be associated with either uplink signals and channels or downlink signals and channels being disallowed for the one or more full-duplex time intervals.

In a second additional aspect, alone or in combination with the first aspect, process 1100 may include dropping, during the full-duplex time interval or another full-duplex time interval of the one or more full-duplex time intervals, another communication in accordance with the other communication being in the disallowed communication direction. That is, the other communication may be dropped if the UE determines, in accordance with the indication of the disallowed communication direction, that the other communication is in the disallowed communication direction.

In a third additional aspect, alone or in combination with one or more of the first and second aspects, the other communication may be a downlink communication, and process 1100 may include refraining from transmitting a hybrid automatic repeat request (HARQ) feedback indication associated with the downlink communication.

In a fourth additional aspect, alone or in combination with one or more of the first through third aspects, refraining from transmitting the HARQ feedback indication associated with the downlink communication may include transmitting a Type-1 HARQ codebook that is associated with a set of downlink occasions including a downlink occasion corresponding to the downlink communication, the Type-1 HARQ codebook not including an indication for the downlink occasion.

In a fifth additional aspect, alone or in combination with one or more of the first through fourth aspects, the disallowed communication direction may be disallowed for a CORESET pool index value, the downlink occasion may be associated with the CORESET pool index value, and the Type-1 HARQ codebook may be associated with the CORESET pool index value.

In a sixth additional aspect, alone or in combination with one or more of the first through fifth aspects, the other communication may be a downlink communication, and process 1100 may include transmitting a NACK indication for the downlink communication.

In a seventh additional aspect, alone or in combination with one or more of the first through sixth aspects, the indication of the disallowed communication direction may be communicated via radio resource control signaling or MAC control element signaling.

In an eighth additional aspect, alone or in combination with one or more of the first through seventh aspects, the indication of the disallowed communication direction may include an indication that the disallowed communication direction is disallowed, during the one or more full-duplex time intervals, for communications associated with a CORESET pool index value.

In a ninth additional aspect, alone or in combination with one or more of the first through eighth aspects, the indication of the disallowed communication direction may include an indication of a first disallowed communication direction for communications associated with a first CORESET pool index value and an indication of a second disallowed communication direction for communications associated with a second CORESET pool index value.

In a tenth additional aspect, alone or in combination with one or more of the first through ninth aspects, the indication of the disallowed communication direction may include an indication of a TCI state associated with a full-duplex operating state and the disallowed communication direction, the TCI state indicating that the disallowed communication direction is disallowed for the one or more full-duplex time intervals.

In an eleventh additional aspect, alone or in combination with one or more of the first through tenth aspects, the indication of the TCI state may include that the TCI state is associated with a CORESET pool index value, the TCI state indicating that communications associated with the CORESET pool index value and the disallowed communication direction are disallowed for the one or more full-duplex time intervals.

In a twelfth additional aspect, alone or in combination with one or more of the first through eleventh aspects, the one or more full-duplex time intervals may be one or more subband-full-duplex time intervals.

In a thirteenth additional aspect, alone or in combination with one or more of the first through twelfth aspects, the one or more full-duplex time intervals may include at least one of one or more full-duplex slots, or one or more full-duplex OFDM symbols.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

FIG. 12 is a flowchart illustrating an example process 1200 performed, for example, by a network node that supports a disallowed communication direction for full-duplex time intervals in accordance with the present disclosure. Example process 1200 is an example where the network node (for example, network node 110) performs operations associated with a disallowed communication direction for full-duplex time intervals.

As shown in FIG. 12, in some aspects, process 1200 may include transmitting an indication, associated with a UE, of one or more full-duplex time intervals (block 1210). For example, the network node (such as by using communication manager 150 or transmission component 1404, depicted in FIG. 14) may transmit an indication, associated with a UE, of one or more full-duplex time intervals, as described above.

As further shown in FIG. 12, in some aspects, process 1200 may include transmitting an indication, associated with the UE, of a disallowed communication direction associated with the one or more full-duplex time intervals (block 1220). For example, the network node (such as by using communication manager 150 or transmission component 1404, depicted in FIG. 14) may transmit an indication, associated with the UE, of a disallowed communication direction associated with the one or more full-duplex time intervals, as described above.

As further shown in FIG. 12, in some aspects, process 1200 may include transmitting or receiving, during a full-duplex time interval of the one or more full-duplex time intervals, a communication, for the UE, in accordance with the communication being in a communication direction that is not the disallowed communication direction (block 1230). For example, the network node (such as by using communication manager 150, transmission component 1404, or reception component 1402, depicted in FIG. 14) may transmit or receive, during a full-duplex time interval of the one or more full-duplex time intervals, a communication, for the UE, in accordance with the communication being in a communication direction that is not the disallowed communication direction, as described above.

Process 1200 may include additional aspects, such as any single aspect or any combination of aspects described below or in connection with one or more other processes described elsewhere herein.

In a first additional aspect, the indication of the disallowed communication direction may be associated with either uplink signals and channels or downlink signals and channels being disallowed for the one or more full-duplex time intervals.

In a second additional aspect, alone or in combination with the first aspect, process 1200 may include dropping, during the full-duplex time interval or another full-duplex time interval of the one or more full-duplex time intervals, another communication in accordance with the other communication being in the disallowed communication direction. That is, the other communication may be drop if the network node determines, in accordance with the indication of the disallowed communication direction, that the other communication is in the disallowed communication direction.

In a third additional aspect, alone or in combination with one or more of the first and second aspects, the other communication may be a downlink communication, and process 1100 may include receiving a Type-1 HARQ codebook that is associated with a set of downlink occasions including a downlink occasion corresponding to the downlink communication, the Type-1 HARQ codebook not including an indication for the downlink occasion.

In a fourth additional aspect, alone or in combination with one or more of the first through third aspects, the disallowed communication direction may be disallowed for a CORESET pool index value, the downlink occasion may be associated with the CORESET pool index value, and the Type-1 HARQ codebook may be associated with the CORESET pool index value.

In a fifth additional aspect, alone or in combination with one or more of the first through fourth aspects, the other communication may be a downlink communication, and process 1200 may include receiving a NACK indication for the downlink communication.

In a sixth additional aspect, alone or in combination with one or more of the first through fifth aspects, the indication of the disallowed communication direction may be communicated via radio resource control signaling or MAC control element signaling.

In a seventh additional aspect, alone or in combination with one or more of the first through sixth aspects, the indication of the disallowed communication direction may include an indication that the disallowed communication direction is disallowed, during the one or more full-duplex time intervals, for communications associated with a CORESET pool index value.

In an eighth additional aspect, alone or in combination with one or more of the first through seventh aspects, the indication of the disallowed communication direction may include an indication of a first disallowed communication direction for communications associated with a first CORESET pool index value and an indication of a second disallowed communication direction for communications associated with a second CORESET pool index value.

In a ninth additional aspect, alone or in combination with one or more of the first through eighth aspects, the indication of the disallowed communication direction may include an indication of a TCI state associated with a full-duplex operating state and the disallowed communication direction, the TCI state indicating that the disallowed communication direction is disallowed for the one or more full-duplex time intervals.

In a tenth additional aspect, alone or in combination with one or more of the first through ninth aspects, the indication of the TCI state may include that the TCI state is associated with a CORESET pool index value, the TCI state indicating that communications associated with the CORESET pool index value and the disallowed communication direction are disallowed for the one or more full-duplex time intervals.

In an eleventh additional aspect, alone or in combination with one or more of the first through tenth aspects, the one or more full-duplex time intervals may be one or more subband-full-duplex time intervals.

In a twelfth additional aspect, alone or in combination with one or more of the first through eleventh aspects, the one or more full-duplex time intervals may include at least one of one or more full-duplex slots, or one or more full-duplex OFDM symbols.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

FIG. 13 is a diagram of an example apparatus 1300 for wireless communication that supports a disallowed communication direction for full-duplex time intervals in accordance with the present disclosure. The apparatus 1300 may be a UE, or a UE may include the apparatus 1300. In some aspects, the apparatus 1300 includes a reception component 1302, a transmission component 1304, and a communication manager 140, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to and/or operable to perform one or more operations described herein in connection with FIGS. 8-10. Additionally or alternatively, the apparatus 1300 may be configured to and/or operable to perform one or more processes described herein, such as process 1100 of FIG. 11. In some aspects, the apparatus 1300 may include one or more components of the UE described above in connection with FIG. 2.

The reception component 1302 may receive communications, such as reference signals, control information, and/or data communications, from the apparatus 1306. The reception component 1302 may provide received communications to one or more other components of the apparatus 1300, such as the communication manager 140. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, and/or a memory of the UE described above in connection with FIG. 2.

The transmission component 1304 may transmit communications, such as reference signals, control information, and/or data communications, to the apparatus 1306. In some aspects, the communication manager 140 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, and/or a memory of the UE described above in connection with FIG. 2. In some aspects, the transmission component 1304 may be co-located with the reception component 1302 in a transceiver.

The communication manager 140 may receive or may cause the reception component 1302 to receive, from a network node, an indication of one or more full-duplex time intervals. The communication manager 140 may receive or may cause the reception component 1302 to receive, from the network node, an indication of a disallowed communication direction associated with the one or more full-duplex time intervals. The communication manager 140 may transmit or may cause the transmission component 1304 to transmit, or the communication manager 140 may receive or may cause the reception component 1302 to receive, to or from the network node and during a full-duplex time interval of the one or more full-duplex time intervals, a communication in accordance with the communication being in a communication direction that is not the disallowed communication direction. In some aspects, the communication manager 140 may perform one or more operations described elsewhere herein as being performed by one or more components of the communication manager 140.

The communication manager 140 may include a controller/processor, a memory, of the UE described above in connection with FIG. 2. In some aspects, the communication manager 140 includes a set of components, such as a dropping component 1308, and/or a determination component 1310, among other examples. Alternatively, the set of components may be separate and distinct from the communication manager 140. In some aspects, one or more components of the set of components may include or may be implemented within a controller/processor, a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive, from a network node, an indication of one or more full-duplex time intervals. The reception component 1302 may receive, from the network node, an indication of a disallowed communication direction associated with the one or more full-duplex time intervals. The transmission component 1304 may transmit or receive, to or from the network node and during a full-duplex time interval of the one or more full-duplex time intervals, a communication in accordance with the communication being in a communication direction that is not the disallowed communication direction.

The dropping component 1308 may drop, during the full-duplex time interval or another full-duplex time interval of the one or more full-duplex time intervals, another communication in accordance with the other communication being in the disallowed communication direction.

The determination component 1310 may determine a duplex type associated with a time interval based on, in response to, or otherwise associated with the indication of the one or more full-duplex time intervals.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

FIG. 14 is a diagram of an example apparatus 1400 for wireless communication that supports a disallowed communication direction for full-duplex time intervals in accordance with the present disclosure. The apparatus 1400 may be a network node, or a network node may include the apparatus 1400. In some aspects, the apparatus 1400 includes a reception component 1402, a transmission component 1404, and a communication manager 150, which may be in communication with one another (for example, via one or more buses). As shown, the apparatus 1400 may communicate with another apparatus 1406 (such as a UE, a network node, or another wireless communication device) using the reception component 1402 and the transmission component 1404.

In some aspects, the apparatus 1400 may be configured to and/or operable to perform one or more operations described herein in connection with FIGS. 8-10. Additionally or alternatively, the apparatus 1400 may be configured to and/or operable to perform one or more processes described herein, such as process 1200 of FIG. 12. In some aspects, the apparatus 1400 may include one or more components of the network node described above in connection with FIG. 2.

The reception component 1402 may receive communications, such as reference signals, control information, and/or data communications, from the apparatus 1406. The reception component 1402 may provide received communications to one or more other components of the apparatus 1400, such as the communication manager 150. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, and/or a memory of the network node described above in connection with FIG. 2.

The transmission component 1404 may transmit communications, such as reference signals, control information, and/or data communications, to the apparatus 1406. In some aspects, the communication manager 150 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, and/or a memory of the network node described above in connection with FIG. 2. In some aspects, the transmission component 1404 may be co-located with the reception component 1402 in a transceiver.

The communication manager 150 may transmit or may cause the transmission component 1404 to transmit an indication, associated with a UE, of one or more full-duplex time intervals. The communication manager 150 may transmit or may cause the transmission component 1404 to transmit an indication, associated with the UE, of a disallowed communication direction associated with the one or more full-duplex time intervals. The communication manager 150 may transmit or may cause the transmission component 1404 to transmit, or the communication manager 150 may receive or may cause the reception component 1402 to receive, during a full-duplex time interval of the one or more full-duplex time intervals, a communication, for the UE, in accordance with the communication being in a communication direction that is not the disallowed communication direction. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a dropping component 1408, and/or a communication direction determination component 1410. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1404 may transmit an indication, associated with a UE, of one or more full-duplex time intervals. The transmission component 1404 may transmit an indication, associated with the UE, of a disallowed communication direction associated with the one or more full-duplex time intervals. The transmission component 1404 may transmit or receive, during a full-duplex time interval of the one or more full-duplex time intervals, a communication, for the UE, in accordance with the communication being in a communication direction that is not the disallowed communication direction.

The dropping component 1408 may drop, during the full-duplex time interval or another full-duplex time interval of the one or more full-duplex time intervals, another communication in accordance with the other communication being in the disallowed communication direction.

The communication direction determination component 1410 may determine the disallowed communication direction for the UE. The communication direction determination component 1410 may determine the disallowed communication direction for the UE based on, in response to, or otherwise associated with a serving TRP of the UE or an antenna configuration of the network node.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a network node, an indication of one or more full-duplex time intervals; receiving, from the network node, an indication of a disallowed communication direction associated with the one or more full-duplex time intervals; and transmitting or receiving, to or from the network node and during a full-duplex time interval of the one or more full-duplex time intervals, a communication in accordance with the communication being in a communication direction that is not the disallowed communication direction.

Aspect 2: The method of Aspect 1, wherein the indication of the disallowed communication direction is associated with either uplink signals and channels or downlink signals and channels being disallowed for the one or more full-duplex time intervals.

Aspect 3: The method of any of Aspects 1-2, further comprising: dropping, during the full-duplex time interval or another full-duplex time interval of the one or more full-duplex time intervals, another communication in accordance with the other communication being in the disallowed communication direction.

Aspect 4: The method of Aspect 3, wherein the other communication is a downlink communication, the method further comprising: refraining from transmitting a hybrid automatic repeat request (HARQ) feedback indication associated with the downlink communication.

Aspect 5: The method of Aspect 4, wherein refraining from transmitting the HARQ feedback indication associated with the downlink communication comprises: transmitting a Type-1 HARQ codebook that is associated with a set of downlink occasions including a downlink occasion corresponding to the downlink communication, the Type-1 HARQ codebook not including an indication for the downlink occasion.

Aspect 6: The method of Aspect 5, wherein the disallowed communication direction is disallowed for a control resource set (CORESET) pool index value, wherein the downlink occasion is associated with the CORESET pool index value, and wherein the Type-1 HARQ codebook is associated with the CORESET pool index value.

Aspect 7: The method of Aspect 3, wherein the other communication is a downlink communication, the method further comprising: transmitting a negative acknowledgement (NACK) indication for the downlink communication.

Aspect 8: The method of any of Aspects 1-7, wherein the indication of the disallowed communication direction is communicated via radio resource control signaling or medium access control (MAC) control element signaling.

Aspect 9: The method of any of Aspects 1-8, wherein the indication of the disallowed communication direction comprises an indication that the disallowed communication direction is disallowed, during the one or more full-duplex time intervals, for communications associated with a control resource set (CORESET) pool index value.

Aspect 10: The method of any of Aspects 1-9, wherein the indication of the disallowed communication direction comprises an indication of a first disallowed communication direction for communications associated with a first control resource set (CORESET) pool index value and an indication of a second disallowed communication direction for communications associated with a second CORESET pool index value.

Aspect 11: The method of any of Aspects 1-10, wherein the indication of the disallowed communication direction comprises an indication of a transmission configuration indicator (TCI) state associated with a full-duplex operating state and the disallowed communication direction, the TCI state indicating that the disallowed communication direction is disallowed for the one or more full-duplex time intervals.

Aspect 12: The method of Aspect 11, wherein the indication of the TCI state indicates that the TCI state is associated with a control resource set (CORESET) pool index value, the TCI state indicating that communications associated with the CORESET pool index value and the disallowed communication direction are disallowed for the one or more full-duplex time intervals.

Aspect 13: The method of any of Aspects 1-12, wherein the one or more full-duplex time intervals are one or more subband-full-duplex time intervals.

Aspect 14: The method of any of Aspects 1-13, wherein the one or more full-duplex time intervals include at least one of: one or more full-duplex slots, or one or more full-duplex orthogonal frequency-division multiplexing (OFDM) symbols.

Aspect 15: A method of wireless communication performed by a network node, comprising: transmitting an indication, associated with a user equipment (UE), of one or more full-duplex time intervals; transmitting an indication, associated with the UE, of a disallowed communication direction associated with the one or more full-duplex time intervals; and transmitting or receiving, during a full-duplex time interval of the one or more full-duplex time intervals, a communication, for the UE, in accordance with the communication being in a communication direction that is not the disallowed communication direction.

Aspect 16: The method of Aspect 15, wherein the indication of the disallowed communication direction is associated with either uplink signals and channels or downlink signals and channels being disallowed for the one or more full-duplex time intervals.

Aspect 17: The method of any of Aspects 15-16, further comprising: dropping, during the full-duplex time interval or another full-duplex time interval of the one or more full-duplex time intervals, another communication in accordance with the other communication being in the disallowed communication direction.

Aspect 18: The method of Aspect 17, wherein the other communication is a downlink communication, the method further comprising: receiving a Type-1 HARQ codebook that is associated with a set of downlink occasions including a downlink occasion corresponding to the downlink communication, the Type-1 HARQ codebook not including an indication for the downlink occasion.

Aspect 19: The method of Aspect 18, wherein the disallowed communication direction is disallowed for a control resource set (CORESET) pool index value, wherein the downlink occasion is associated with the CORESET pool index value, and wherein the Type-1 HARQ codebook is associated with the CORESET pool index value.

Aspect 20: The method of Aspect 17, wherein the other communication is a downlink communication, the method further comprising: receiving a negative acknowledgement (NACK) indication for the downlink communication.

Aspect 21: The method of any of Aspects 15-20, wherein the indication of the disallowed communication direction is communicated via radio resource control signaling or medium access control (MAC) control element signaling.

Aspect 22: The method of any of Aspects 15-21, wherein the indication of the disallowed communication direction comprises an indication that the disallowed communication direction is disallowed, during the one or more full-duplex time intervals, for communications associated with a control resource set (CORESET) pool index value.

Aspect 23: The method of any of Aspects 15-22, wherein the indication of the disallowed communication direction comprises an indication of a first disallowed communication direction for communications associated with a first control resource set (CORESET) pool index value and an indication of a second disallowed communication direction for communications associated with a second CORESET pool index value.

Aspect 24: The method of any of Aspects 15-23, wherein the indication of the disallowed communication direction comprises an indication of a transmission configuration indicator (TCI) state associated with a full-duplex operating state and the disallowed communication direction, the TCI state indicating that the disallowed communication direction is disallowed for the one or more full-duplex time intervals.

Aspect 25: The method of Aspect 24, wherein the indication of the TCI state indicates that the TCI state is associated with a control resource set (CORESET) pool index value, the TCI state indicating that communications associated with the CORESET pool index value and the disallowed communication direction are disallowed for the one or more full-duplex time intervals.

Aspect 26: The method of any of Aspects 15-25, wherein the one or more full-duplex time intervals are one or more subband-full-duplex time intervals.

Aspect 27: The method of any of Aspects 15-26, wherein the one or more full-duplex time intervals include at least one of: one or more full-duplex slots, or one or more full-duplex orthogonal frequency-division multiplexing (OFDM) symbols.

Aspect 28: An apparatus for wireless communication at a device, comprising a processor; memory coupled with the processor; and instructions stored in the memory and executable by the processor to cause the apparatus to perform the method of one or more of Aspects 1-14.

Aspect 29: A device for wireless communication, comprising a memory and one or more processors coupled to the memory, the one or more processors configured to perform the method of one or more of Aspects 1-14.

Aspect 30: An apparatus for wireless communication, comprising at least one means for performing the method of one or more of Aspects 1-14.

Aspect 31: A non-transitory computer-readable medium storing code for wireless communication, the code comprising instructions executable by a processor to perform the method of one or more of Aspects 1-14.

Aspect 32: A non-transitory computer-readable medium storing a set of instructions for wireless communication, the set of instructions comprising one or more instructions that, when executed by one or more processors of a device, cause the device to perform the method of one or more of Aspects 1-14.

Aspect 33: An apparatus for wireless communication at a device, comprising a processor; memory coupled with the processor; and instructions stored in the memory and executable by the processor to cause the apparatus to perform the method of one or more of Aspects 15-27.

Aspect 34: A device for wireless communication, comprising a memory and one or more processors coupled to the memory, the one or more processors configured to perform the method of one or more of Aspects 15-27.

Aspect 35: An apparatus for wireless communication, comprising at least one means for performing the method of one or more of Aspects 15-27.

Aspect 36: A non-transitory computer-readable medium storing code for wireless communication, the code comprising instructions executable by a processor to perform the method of one or more of Aspects 15-27.

Aspect 37: A non-transitory computer-readable medium storing a set of instructions for wireless communication, the set of instructions comprising one or more instructions that, when executed by one or more processors of a device, cause the device to perform the method of one or more of Aspects 15-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. Also, "determining" can include resolving, selecting, obtaining, choosing, establishing and other such similar actions.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor communicatively coupled with the at least one memory, the at least one processor operable to cause the UE to:

receive, from a network node, an indication of a disallowed communication direction associated with one or more full-duplex time intervals, wherein one or more resource occasions that correspond to the one or more full-duplex time intervals are excluded from a Type-1 hybrid automatic repeat request (HARQ) codebook; and transmit or receive, to or from the network node and during a full-duplex time interval of the one or more full-duplex time intervals, a communication in accordance with the communication being in a communication direction that is not the disallowed communication direction.

2. The UE of claim 1, wherein the indication of the disallowed communication direction is associated with either uplink signals and channels or downlink signals and channels being disallowed for the one or more full-duplex time intervals.

3. The UE of claim 1, wherein the at least one processor is further operable to cause the UE to:

drop, during the full-duplex time interval or an other full-duplex time interval of the one or more full-duplex time intervals, an other communication in accordance with the other communication being in the disallowed communication direction.

4. The UE of claim 3, wherein the other communication is a downlink communication, wherein the at least one processor is further operable to cause the UE to:

refrain from transmitting a HARQ feedback indication associated with the downlink communication.

5. The UE of claim 4, wherein, to cause the UE to refrain from transmitting the HARQ feedback indication associated with the downlink communication, the at least one processor is operable to cause the UE to:

transmit the Type-1 HARQ codebook.

6. The UE of claim 5, wherein the disallowed communication direction is disallowed for a control resource set (CORESET) pool index value, and wherein the Type-1 HARQ codebook is associated with the CORESET pool index value.

7. The UE of claim 3, wherein the other communication is a downlink communication, wherein the at least one processor is further operable to cause the UE to:

transmit a negative acknowledgement (NACK) indication for the downlink communication.

8. The UE of claim 1, wherein the indication of the disallowed communication direction is communicated via radio resource control signaling or medium access control (MAC) control element signaling.

9. The UE of claim 1, wherein the indication of the disallowed communication direction comprises an indication that the disallowed communication direction is disallowed, during the one or more full-duplex time intervals, for communications associated with a control resource set (CORESET) pool index value.

10. The UE of claim 1, wherein the indication of the disallowed communication direction comprises an indication of a first disallowed communication direction for communications associated with a first control resource set (CORESET) pool index value and an indication of a second disallowed communication direction for communications associated with a second CORESET pool index value.

11. The UE of claim 1, wherein the indication of the disallowed communication direction comprises an indication of a transmission configuration indicator (TCI) state associated with a full-duplex operating state and the disallowed communication direction, the TCI state indicating that the disallowed communication direction is disallowed for the one or more full-duplex time intervals.

12. The UE of claim 11, wherein the indication of the TCI state indicates that the TCI state is associated with a control resource set (CORESET) pool index value, the TCI state indicating that communications associated with the CORESET pool index value and the disallowed communication direction are disallowed for the one or more full-duplex time intervals.

13. A network node for wireless communication, the network node comprising:

at least one memory; and at least one processor communicatively coupled with the at least one memory, the at least one processor operable to cause the network node to:

transmit an indication, associated with a user equipment (UE), of a disallowed communication direction associated with one or more full-duplex time intervals, wherein one or more resource occasions that correspond to the one or more full-duplex time intervals are excluded from a Type-1 hybrid automatic repeat request (HARQ) codebook; and transmit or receive, during a full-duplex time interval of the one or more full-duplex time intervals, a communication, for the UE, in accordance with the communication being in a communication direction that is not the disallowed communication direction.

14. The network node of claim 13, wherein the indication of the disallowed communication direction is associated with either uplink signals and channels or downlink signals and channels being disallowed for the one or more full-duplex time intervals.

15. The network node of claim 13, wherein the at least one processor is further operable to cause the network node to:

drop, during the full-duplex time interval or an other full-duplex time interval of the one or more full-duplex time intervals, an other communication in accordance with the other communication being in the disallowed communication direction.

16. The network node of claim 15, wherein the other communication is a downlink communication, wherein the at least one processor is further operable to cause the network node to:

receive the Type-1 HARQ codebook.

17. The network node of claim 13, wherein the indication of the disallowed communication direction comprises an indication that the disallowed communication direction is disallowed, during the one or more full-duplex time intervals, for communications associated with a control resource set (CORESET) pool index value.

18. The network node of claim 13, wherein the indication of the disallowed communication direction comprises an indication of a transmission configuration indicator (TCI) state associated with a full-duplex operating state and the disallowed communication direction, the TCI state indicating that the disallowed communication direction is disallowed for the one or more full-duplex time intervals.

19. A method of wireless communication performed by a user equipment (UE), comprising:

receiving, from a network node, an indication of a disallowed communication direction associated with one or more full-duplex time intervals, wherein one or more resources occasions that correspond to the one or more full-duplex time intervals are excluded from a Type-1 hybrid automatic repeat request (HARQ) codebook; and transmitting or receiving, to or from the network node and during a full-duplex time interval of the one or more full-duplex time intervals, a communication in accordance with the communication being in a communication direction that is not the disallowed communication direction.

20. The method of claim 19, wherein the indication of the disallowed communication direction is associated with either uplink signals and uplink channels or downlink signals and downlink channels being disallowed for the one or more full-duplex time intervals.

21. The method of claim 19, further comprising:

dropping, during the full-duplex time interval or an other full-duplex time interval of the one or more full-duplex time intervals, an other communication in accordance with the other communication being in the disallowed communication direction.

22. The method of claim 21, wherein the other communication is a downlink communication, the method further comprising:

refraining from transmitting a HARQ feedback indication associated with the downlink communication.

23. The method of claim 22, wherein refraining from transmitting the HARQ feedback indication associated with the downlink communication comprises:

transmitting the Type-1 HARQ codebook.

24. The method of claim 23, wherein the disallowed communication direction is disallowed for a control resource set (CORESET) pool index value, and wherein the Type-1 HARQ codebook is associated with the CORESET pool index value.

25. The method of claim 19, wherein the indication of the disallowed communication direction comprises an indication of a transmission configuration indicator (TCI) state associated with a full-duplex operating state and the disallowed communication direction, the TCI state indicating that the disallowed communication direction is disallowed for the one or more full-duplex time intervals.

26. A method of wireless communication performed by a network node, the method comprising:

transmitting an indication, associated with a user equipment (UE), of a disallowed communication direction associated with one or more full-duplex time intervals, wherein one or more resource occasions that correspond to the one or more full-duplex time intervals are excluded from a Type-1 hybrid automatic repeat request (HARQ) codebook; and transmitting or receiving, during a full-duplex time interval of the one or more full-duplex time intervals, a communication, for the UE, in accordance with the communication being in a communication direction that is not the disallowed communication direction.

27. The method of claim 26, wherein the indication of the disallowed communication direction is associated with either uplink signals and uplink channels or downlink signals and downlink channels being disallowed for the one or more full-duplex time intervals.

28. The method of claim 26, further comprising:

dropping, during the full-duplex time interval or an other full-duplex time interval of the one or more full-duplex time intervals, an other communication in accordance with the other communication being in the disallowed communication direction.

29. The method of claim 28, wherein the other communication is a downlink communication, the method further comprising:

receiving the Type-1 HARQ codebook.

30. The method of claim 26, wherein the one or more full-duplex time intervals include at least one of:

one or more full-duplex slots, or one or more full-duplex orthogonal frequency-division multiplexing (OFDM) symbols.

* * * * *